(12) United States Patent
Ye et al.

(10) Patent No.: US 12,363,048 B2
(45) Date of Patent: *Jul. 15, 2025

(54) CONGESTION CONTROL METHOD, APPARATUS, AND SYSTEM, AND COMPUTER STORAGE MEDIUM

(71) Applicant: Huawei Technologies Co., Ltd., Shenzhen (CN)

(72) Inventors: Haonan Ye, Nanjing (CN); Liang Zhang, Nanjing (CN); Jian Cheng, Nanjing (CN); Jun Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 18 days.

This patent is subject to a terminal disclaimer.

(21) Appl. No.: 18/305,421

(22) Filed: Apr. 24, 2023

(65) Prior Publication Data

US 2023/0261993 A1    Aug. 17, 2023

Related U.S. Application Data

(63) Continuation of application No. 17/244,256, filed on Apr. 29, 2021, now Pat. No. 11,671,368.

(30) Foreign Application Priority Data

Apr. 29, 2020    (CN) .......................... 202010358527.7

(51) Int. Cl.
*H04L 47/12*    (2022.01)
*H04L 41/14*    (2022.01)
(Continued)

(52) U.S. Cl.
CPC .............. *H04L 47/33* (2013.01); *H04L 41/14* (2013.01); *H04L 47/11* (2013.01); *H04L 47/12* (2013.01)

(58) Field of Classification Search
None
See application file for complete search history.

(56) References Cited

U.S. PATENT DOCUMENTS 8,693,320 B2 * 4/2014 Furbeck ............ H04W 28/0284
370/229
9,660,914 B1    5/2017 Zhou et al.
(Continued)

FOREIGN PATENT DOCUMENTS

CN    107749827 A    3/2018
CN    110061927 A    7/2019
(Continued)

OTHER PUBLICATIONS

Majidi, A., et al., "Deep-RL: Deep Reinforcement Learning for Marking-Aware via per-Port in Data Centers" IEEE 25th International Conference on Parallel and Distributed Systems (ICPADS), Dec. 4, 2019, 4 pages.

(Continued)

*Primary Examiner* — Eunsook Choi
(74) *Attorney, Agent, or Firm* — Conley Rose, P.C.

(57) ABSTRACT

A network device inputs first network status information of the network device in a first time period to an ECN inference model, to obtain an inference result that is output by the ECN inference model based on the first network status information. Then, the network device sends an ECN parameter sample to an analysis device that manages the network device, where the ECN parameter sample includes the first network status information and a target ECN configuration parameter corresponding to the first network status information, and the target ECN configuration parameter is obtained based on the inference result. The network device receives an updated ECN inference model sent by the analysis device.

20 Claims, 11 Drawing Sheets

(51) Int. Cl.
*H04L 47/11* (2022.01)
*H04L 47/33* (2022.01)

(56) References Cited

U.S. PATENT DOCUMENTS

| | | |
|---|---|---|
| 10,333,853 B1 | 6/2019 | Seshadri et al. |
| 10,673,648 B1 | 6/2020 | Viljoen et al. |
| 2007/0058536 A1 | 3/2007 | Vaananen et al. |
| 2008/0239953 A1 | 10/2008 | Bai et al. |
| 2014/0301197 A1* | 10/2014 | Birke .................. H04L 47/522 370/235 |
| 2015/0029887 A1 | 1/2015 | Briscoe et al. |
| 2015/0215067 A1* | 7/2015 | Ludwig ................ H04L 47/10 370/235 |
| 2015/0295856 A1 | 10/2015 | Karthikeyan et al. |
| 2016/0248675 A1 | 8/2016 | Zheng et al. |
| 2017/0295098 A1 | 10/2017 | Watkins et al. |
| 2018/0191617 A1 | 7/2018 | Caulfiend et al. |
| 2019/0068502 A1 | 2/2019 | Shiraki |
| 2019/0089645 A1 | 3/2019 | Fu et al. |
| 2019/0386924 A1* | 12/2019 | Srinivasan ............ H04L 47/122 |

FOREIGN PATENT DOCUMENTS

| | | |
|---|---|---|
| CN | 110581808 A | 12/2019 |
| JP | 2003249953 A | 9/2003 |
| JP | 2019047254 A | 3/2019 |

OTHER PUBLICATIONS

Majidi, A., et al., "DC-ECN: A machine-learning based dynamic threshold control scheme for ECN marking in DCN," Nov. 11, 2019, 12 pages.

* cited by examiner

CONGESTION CONTROL METHOD, APPARATUS, AND SYSTEM, AND COMPUTER STORAGE MEDIUM

CROSS-REFERENCE TO RELATED APPLICATIONS

This is a continuation of U.S. patent application Ser. No. 17/244,256, filed on Apr. 29, 2021, which claims priority to Chinese Patent Application No. 202010358527.7, filed on Apr. 29, 2020. The aforementioned patent applications are hereby incorporated by reference in their entireties.

FIELD

This disclosure relates to the field of network technologies, and in particular, to a congestion control method, apparatus, and system, and a computer storage medium.

BACKGROUND

Congestion control is an important method to improve network resource utilization and optimize network transmission quality. In a current network, congestion control is usually performed based on an explicit congestion notification (ECN) mechanism.

Currently, communication between a transmit end and a receive end is implemented through forwarding of a data packet by a network device. An ECN configuration parameter is usually configured in the network device. The ECN configuration parameter includes an ECN threshold, where the ECN threshold may also be referred to as an ECN threshold. A process in which congestion control is performed in the network based on the ECN mechanism includes: sending, by the transmit end, a data packet that supports the ECN mechanism. The network device determines, based on a queue depth of an egress queue and an ECN threshold, whether to ECN mark a data packet to be added to the egress queue. ECN thresholds generally include an ECN maximum threshold and an ECN minimum threshold. When the queue depth of the egress queue is greater than the ECN maximum threshold, a probability that the data packet to be added to the egress queue is ECN marked is 1. When the queue depth of the egress queue is between the ECN minimum threshold and the ECN maximum threshold, a probability that the data packet to be added to the egress queue is ECN marked is greater than 0 and less than 1, and the probability that the data packet is ECN marked is in a positive correlation with the queue depth of the egress queue. When the queue depth of the egress queue is less than the ECN minimum threshold, a probability that the data packet to be added to the egress queue is ECN marked is 0. After receiving the data packet that is ECN marked, the receive end sends a congestion notification packet to the transmit end. The transmit end adjusts a sending rate of a subsequent data packet based on a quantity of received congestion notification packets, to avoid network congestion. The egress queue in the network device may also be referred to as a forwarding queue, and the egress queue is used to buffer a data packet transmitted by the transmit end to the receive end.

However, because the ECN configuration parameter in the network device is usually statically configured, when the ECN threshold is set to an excessively high value, a queue depth of the egress queue in the network device is relatively large. Consequently, a transmission delay of a data packet is relatively large. When the ECN threshold is set to an excessively low value, a rate at which the transmit end sends a data packet is relatively low, causing relatively low network resource utilization. Therefore, flexibility of current network congestion control is relatively low.

SUMMARY

This disclosure provides a congestion control method, apparatus, and system, and a computer storage medium, to resolve a current problem that flexibility of network congestion control is relatively low.

According to a first aspect, a congestion control method is provided. The method includes: A network device inputs first network status information of the network device in a first time period into an explicit congestion notification ECN inference model, to obtain an inference result that is output by the ECN inference model based on the first network status information. The inference result includes an original ECN configuration parameter and confidence of the original ECN configuration parameter. The network device sends an ECN parameter sample to an analysis device that manages the network device. The ECN parameter sample includes the first network status information and a target ECN configuration parameter corresponding to the first network status information. The target ECN configuration parameter is obtained based on the inference result that is output by the ECN inference model. The network device receives an updated ECN inference model sent by the analysis device. The updated ECN inference model is obtained through training performed based on the ECN parameter sample.

Optionally, the target ECN configuration parameter is used by the network device to perform congestion control in a second time period, and the second time period is after the first time period in time sequence. The ECN configuration parameter includes an ECN threshold. ECN thresholds may include an ECN maximum threshold and an ECN minimum threshold. When the ECN thresholds may include an ECN maximum threshold and an ECN minimum threshold, the ECN configuration parameter may further include an ECN marking probability. The ECN marking probability is a probability of performing, when a queue depth of an egress queue reaches the ECN maximum threshold, ECN marking on a data packet to be added to the egress queue.

The network device sends the ECN parameter sample to the analysis device, so that the analysis device performs training by using the ECN parameter sample, to obtain an ECN inference model. The analysis device sends the updated ECN inference model to the network device, and then the network device may determine a new ECN configuration parameter by using the updated ECN inference model. In other words, the analysis device may dynamically configure the ECN inference model in the network device. This implements dynamic adjustment of the ECN configuration parameter in the network device and improves flexibility of network congestion control.

Optionally, the network device performs congestion control in the second time period by using the target ECN configuration parameter, and the second time period is after the first time period in time sequence.

The target ECN configuration parameter may be an original ECN configuration parameter whose confidence is greater than or equal to a confidence threshold. Alternatively, the target ECN configuration parameter may be an ECN configuration parameter obtained after transmission performance optimization adjustment is performed on an ECN configuration parameter used by the network device in the first time period. Therefore, the network device performs congestion control in the second time period by using the target ECN configuration parameter, to ensure reliability of transmission performance of the network device and congestion control, and ensure reliability of network running.

Optionally, after the network device obtains the inference result that is output by the ECN inference model based on the first network status information, when the confidence of the original ECN configuration parameter is less than the confidence threshold, the network device adjusts, based on a change of transmission performance of the network device, the ECN configuration parameter used by the network device in the first time period, and uses an adjusted ECN configuration parameter as the target ECN configuration parameter.

When the confidence of the original ECN configuration parameter output by the ECN inference model in the network device is less than the confidence threshold, the network device does not use the original ECN configuration parameter, to prevent network transmission performance deterioration. The network device adjusts, based on the change of transmission performance of the network device, the ECN configuration parameter used in the first time period, so that transmission performance existing when the network device performs congestion control by using the adjusted ECN configuration parameter is better than transmission performance existing when the network device performs congestion control by using the ECN configuration parameter obtained before the adjustment. The network device uses the adjusted ECN configuration parameter as the target ECN configuration parameter. This ensures reliability of an ECN inference model that is subsequently obtained after the analysis device performs training by using the ECN parameter sample.

Optionally, an implementation process in which the network device adjusts, based on the change of transmission performance of the network device, the ECN configuration parameter used by the network device in the first time period includes the following:

When transmission performance of the network device in the first time period is improved compared with transmission performance of the network device in a third time period, the network device increases an ECN threshold in the ECN configuration parameter used by the network device in the first time period, and/or lowers an ECN marking probability in the ECN configuration parameter used by the network device in the first time period. Alternatively, when transmission performance of the network device in the first time period deteriorates compared with transmission performance of the network device in a third time period, the network device lowers an ECN threshold in the ECN configuration parameter used by the network device in the first time period, and/or increases an ECN marking probability in the ECN configuration parameter used by the network device in the first time period. The third time period is earlier than the first time period in time sequence.

Optionally, transmission performance of the network device is determined by the network status information. In a same or similar network environment, higher bandwidth utilization of the network device, a smaller queue depth of the egress queue of the network device, and/or a smaller ECN packet ratio of the network device indicate better transmission performance of the network device. When bandwidth utilization of the network device in the first time period is higher than bandwidth utilization of the network device in the third time period, a queue depth of the network device in the first time period is less than a queue depth of the network device in the third time period; and/or when an ECN packet ratio of the network device in the first time period is less than an ECN packet ratio of the network device in the third time period, the network device determines that transmission performance of the network device in the first time period is improved compared with transmission performance of the network device in the third time period.

Optionally, after the network device obtains the inference result that is output by the ECN inference model based on the first network status information, when the confidence of the original ECN configuration parameter is greater than or equal to the confidence threshold, the network device uses the original ECN configuration parameter as the target ECN configuration parameter.

When the confidence of the original ECN configuration parameter output by the ECN inference model in the network device is greater than or equal to the confidence threshold, the network device directly uses the original ECN configuration parameter as the target ECN configuration parameter. This ensures reliability of network transmission performance.

Optionally, after the network device obtains the inference result that is output by the ECN inference model based on the first network status information, when the confidence of the original ECN configuration parameter is less than the confidence threshold, the network device may further send target indication information to the analysis device. The target indication information includes an identifier of the network device, and the target indication information is used to indicate that the ECN inference model in the network device does not adapt to the network device. Optionally, the target indication information includes the confidence of the original ECN configuration parameter.

The network device sends the target indication information to the analysis device, to notify the analysis device that the ECN inference model in the network device does not adapt to the network device, so that the analysis device can effectively update the ECN inference model in the network device in a timely manner, thereby improving update flexibility of the ECN inference model in the network device.

Optionally, after the network device receives the updated ECN inference model sent by the analysis device, the network device updates the ECN inference model in the network device by using the updated ECN inference model.

In a network running process, the network device sends the ECN parameter sample to the analysis device, and the analysis device sends, to the network device, an ECN inference model obtained through training performed based on the ECN parameter sample. Then, the network device sends a new ECN parameter sample to the analysis device based on the updated ECN inference model, and the analysis device sends, to the network device, an ECN inference model obtained through training performed based on the new ECN parameter sample. This implements dynamic configuration of the ECN inference model in the network device, and implements dynamic adjustment of the ECN configuration parameter.

Optionally, the first network status information includes one or more of queue information, throughput information, and congestion information of the network device in the first time period.

According to a second aspect, a congestion control method is provided. The method includes: An analysis device receives an ECN parameter sample sent by a network device managed by the analysis device. The ECN parameter sample includes network status information of the network device and a target ECN configuration parameter corresponding to the network status information; The analysis device performs training, by using the ECN parameter sample, to obtain a first ECN inference model. The analysis device sends the first ECN inference model to the network device.

Optionally, an implementation process in which the analysis device performs training, by using the ECN parameter sample, to obtain the first ECN inference model includes:

When an ECN inference model update condition is met, the analysis device performs training by using the ECN parameter sample, to obtain the first ECN inference model. The ECN inference model update condition includes the following: a quantity of network devices that send target indication information to the analysis device reaches a device quantity threshold, an accumulated quantity of times the analysis device receives the target indication information within first duration reaches a first quantity threshold, and/or a quantity of times the analysis device receives, within second duration, the target indication information sent by any network device managed by the analysis device reaches a second quantity threshold. The target indication information includes an identifier of the network device that sends the target indication information, and the target indication information is used to indicate that an ECN inference model in the network device that sends the target indication information does not adapt to the network device.

When the quantity of network devices that send the target indication information to the analysis device reaches the device quantity threshold, it indicates that in a network managed by the analysis device, ECN inference models in a plurality of network devices do not adapt to the network devices. When the accumulated quantity of times the analysis device receives the target indication information within the first duration reaches the first quantity threshold, and/or the quantity of times the analysis device receives, within the second duration, the target indication information sent by any network device managed by the analysis device reaches the second quantity threshold, it indicates that in the network managed by the analysis device, ECN configuration parameters in one or more network devices usually have low confidence. When ECN inference models in a plurality of network devices in the network managed by the analysis device do not adapt to the network devices, and/or when the network device adjusts the ECN configuration parameter based on transmission performance, the network device may fail to obtain an ECN configuration parameter that can improve transmission performance of the network device, the analysis device performs training by using the ECN parameter sample sent by the network device, to obtain a target ECN inference model. Otherwise, the analysis device does not need to perform training to obtain an ECN inference model. In this way, reliability of the ECN inference model in the network device managed by the analysis device is ensured, and a quantity of times the analysis device updates the ECN inference model is reduced, thereby saving computing resources of the analysis device.

Optionally, an implementation process in which the analysis device sends the first ECN inference model to the network device includes: When the analysis device receives the target indication information sent by the network device, the analysis device sends the first ECN inference model to the network device.

The analysis device may send the target ECN inference model only to a network device that has sent the target indication information (namely, a network device including an ECN inference model that outputs an ECN configuration parameter whose confidence is less than a confidence threshold). This saves transmission resources and saves processing resources of a network device including an ECN inference model that outputs an ECN configuration parameter whose confidence is greater than or equal to the confidence threshold.

Optionally, after the analysis device performs training, by using the ECN parameter sample, to obtain the first ECN inference model, the analysis device sends an ECN message to a cloud device. The ECN message includes the first ECN inference model and an identifier of a service type corresponding to the first ECN inference model.

Optionally, the ECN message further includes networking information of a network managed by the network device.

Optionally, the analysis device may further send an ECN inference model obtaining request to the cloud device. The ECN inference model obtaining request includes a target service type carried in a network managed by the analysis device. The analysis device receives a second ECN inference model that is corresponding to the target service type and that is sent by the cloud device. The analysis device sends the second ECN inference model to the network device managed by the analysis device.

The analysis device may send the ECN inference model obtaining request to the cloud device in an initial phase of network deployment, to request to obtain an initial ECN inference model that needs to be configured in the network managed by the analysis device. Alternatively, when confidence of an ECN configuration parameter of the network device is usually low in the network managed by the analysis device, the analysis device may send the ECN inference model obtaining request to the cloud device. This provides a sound initial ECN inference model for the network device for new network deployment or a networking change.

According to a third aspect, a congestion control method is provided. The method includes: A cloud device receives an ECN inference model obtaining request sent by an analysis device managed by the cloud device. The ECN inference model obtaining request includes a target service type carried in a network managed by the analysis device. The cloud device determines, based on correspondences between service types and ECN inference models, a second ECN inference model corresponding to the target service type. The correspondences include a plurality of service types and a plurality of ECN inference models that are in a one-to-one correspondence. The cloud device sends the second ECN inference model to the analysis device.

The ECN inference model corresponding to each service type is stored in the cloud device. This provides a sound initial ECN inference model for new network deployment or a networking change in the future.

Optionally, the cloud device receives ECN messages sent by a plurality of analysis devices managed by the cloud device. The ECN messages each include a first ECN inference model in the analysis device and an identifier of a service type corresponding to the first ECN inference model. The cloud device generates the correspondences based on the ECN messages sent by the plurality of analysis devices.

The analysis device sends the ECN information including the ECN inference model to the cloud device, so that the cloud device generates or updates the ECN inference model corresponding to the service type, to improve reliability of the ECN inference model stored in the cloud device.

Optionally, an implementation process in which the cloud device generates the correspondences based on the ECN messages sent by the plurality of analysis devices includes: The cloud device classifies first ECN inference models in the plurality of ECN messages based on service types, to obtain one or more model classes. First ECN inference models in a same model class correspond to a same service type. For each model class including a plurality of first ECN inference models, the cloud device performs model iteration processing on the plurality of first ECN inference models in the model class, to obtain one second ECN inference model corresponding to the model class.

According to a fourth aspect, a congestion control apparatus is provided. The congestion control apparatus is used in a network device. The apparatus includes a plurality of functional modules. The plurality of functional modules interact with each other to implement the method in the first aspect and the implementations of the first aspect. The plurality of functional modules may be implemented based on software, hardware, or a combination of software and hardware, and the plurality of functional modules may be randomly combined or divided based on a specific implementation.

According to a fifth aspect, a congestion control apparatus is provided. The congestion control apparatus is used in an analysis device. The apparatus includes a plurality of functional modules. The plurality of functional modules interact with each other to implement the method in the second aspect and the implementations of the second aspect. The plurality of functional modules may be implemented based on software, hardware, or a combination of software and hardware, and the plurality of functional modules may be randomly combined or divided based on a specific implementation.

According to a sixth aspect, a congestion control apparatus is provided. The congestion control apparatus is used in a cloud device. The apparatus includes a plurality of functional modules. The plurality of functional modules interact with each other to implement the method in the third aspect and the implementations of the third aspect. The plurality of functional modules may be implemented based on software, hardware, or a combination of software and hardware, and the plurality of functional modules may be randomly combined or divided based on a specific implementation.

According to a seventh aspect, a network device is provided, including a processor and a memory.

The memory is configured to store a computer program, and the computer program includes a program instruction.

The processor is configured to invoke the computer program to implement the congestion control method according to any one of the implementations of the first aspect.

According to an eighth aspect, an analysis device is provided, including a processor and a memory.

The memory is configured to store a computer program, and the computer program includes a program instruction.

The processor is configured to invoke the computer program to implement the congestion control method according to any one of the implementations of the second aspect.

According to a ninth aspect, a cloud device is provided, including a processor and a memory.

The memory is configured to store a computer program, and the computer program includes a program instruction.

The processor is configured to invoke the computer program to implement the congestion control method according to any one of the implementations of the third aspect.

According to a tenth aspect, a congestion control system is provided, including a network device and an analysis device. The network device includes the congestion control apparatus according to the fourth aspect or the network device according to the seventh aspect. The analysis device includes the congestion control apparatus according to the fifth aspect or the analysis device according to the eighth aspect.

Optionally, the system further includes a cloud device. The cloud device includes the congestion control apparatus according to the sixth aspect or the cloud device according to the ninth aspect.

According to an eleventh aspect, a computer storage medium is provided. The computer storage medium stores an instruction. When the instruction is executed by a processor of a computer device, the congestion control method according to any one of the first aspect and the implementations of the first aspect, the second aspect and the implementations of the second aspect, or the third aspect and the implementations of the third aspect is implemented.

According to a twelfth aspect, a chip is provided. The chip includes a programmable logic circuit and/or a program instruction. When the chip runs, the congestion control method according to any one of the first aspect and the implementations of the first aspect, the second aspect and the implementations of the second aspect, or the third aspect and the implementations of the third aspect is implemented.

Beneficial effects brought by the disclosed technical solutions include at least the following:

The network device sends the ECN parameter sample to the analysis device, so that the analysis device performs training by using the ECN parameter sample, to obtain an ECN inference model. The analysis device sends the updated ECN inference model to the network device, and then the network device may determine a new ECN configuration parameter by using the updated ECN inference model. In other words, the analysis device may dynamically configure the ECN inference model in the network device. This implements dynamic adjustment of the ECN configuration parameter in the network device and improves flexibility of network congestion control.

The cloud device may determine, based on the ECN information sent by the analysis device managed by the cloud device, ECN inference models corresponding to one or more service types. The analysis device may obtain, from the cloud device, the ECN inference model corresponding to the service type carried in the network managed by the analysis device, and then send the ECN inference model to the network device managed by the analysis device. This implements dynamic configuration of the ECN inference model in the network device, implements dynamic adjustment of the ECN configuration parameter, and improves flexibility of network congestion control. In addition, the ECN inference model corresponding to each service type is stored in the cloud device. This provides a sound initial ECN inference model for new network deployment or a networking change in the future.

DETAILED DESCRIPTION

To make the objectives, technical solutions, and advantages clearer, the following further describes the implementations in detail with reference to the accompanying drawings.

Figure 1:
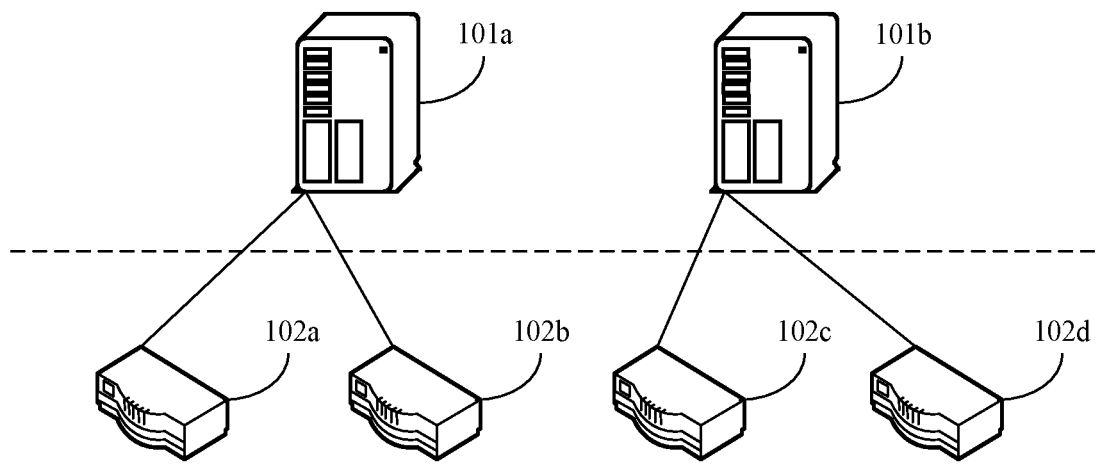
FIG. 1 is a schematic structural diagram of a congestion control system according to an embodiment.

FIG. 1 is a schematic structural diagram of a congestion control system according to an embodiment. As shown in FIG. 1, the system includes analysis devices 101a and 101b (collectively referred to as analysis devices 101) and network devices 102a to 102d (collectively referred to as network devices 102) in a communications network. The analysis device 101 may also be referred to as a device analyzer (DA), and is configured to manage one or more network devices 102. For example, referring to FIG. 1, the analysis device 101a is configured to manage the network device 102a and the network device 102b, and the analysis device 101b is configured to manage the network device 102c and the network device 102d. Quantities of analysis devices and network devices in FIG. 1 are merely used as an example, and are not intended to limit the congestion control system provided in this embodiment.

The analysis device 101 may be one server, a server cluster including several servers, or a cloud computing service center. The network device 102 may be a router, a switch, or the like. The analysis device 101 is connected to, through a wired or wireless network, the network device 102 managed by the analysis device 101. The communications network provided in this embodiment may be a data center network (DCN), a metropolitan area network, a wide area network, a campus network, or the like. A type of the communications network is not limited in this embodiment. A network managed by each analysis device 101 usually carries one service type. In other words, one or more network devices 102 managed by one analysis device 101 run services of a same type. For example, one analysis device 101 may manage a performance optimization datacenter (POD) network or a functional subnet, and carry a specific service, for example, a distributed storage service, a high-performance computing service, or an artificial intelligence (AI) inference service.

Figure 2:
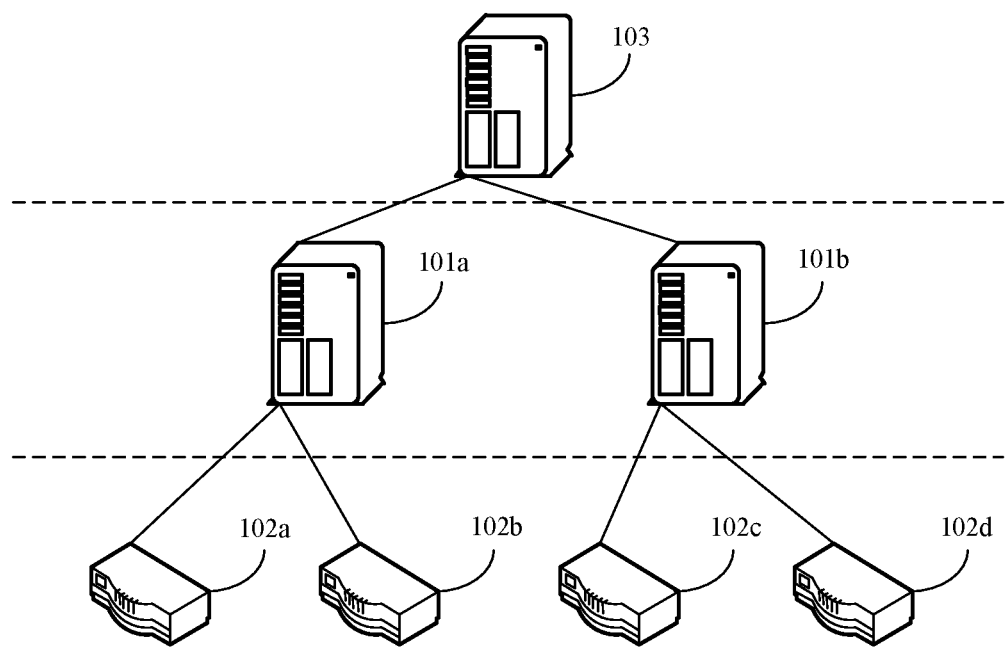
FIG. 2 is a schematic structural diagram of another congestion control system according to an embodiment.

Optionally, FIG. 2 is a schematic structural diagram of another congestion control system according to an embodiment. As shown in FIG. 2, based on the congestion control system shown in FIG. 1, the system further includes a cloud device 103. The cloud device 103 may also be referred to as a cloud analyzer (CA), and is configured to manage one or more analysis devices 101. For example, referring to FIG. 2, the cloud device 103 is configured to manage the analysis device 101a and the analysis device 101b. The cloud device 103 may be one server, a server cluster including several servers, or a cloud computing service center. The cloud device 103 is connected to, through a wired or wireless network, the analysis device 101 managed by the cloud device. Optionally, the cloud device 103 and the analysis device 101 may alternatively be integrated into one device. This is not limited in this embodiment.

Optionally, the communications network provided in this embodiment may be a one-layer network, a two-layer network, or a three-layer network. A network architecture of the communications network is not limited in this embodiment.

Figure 3:
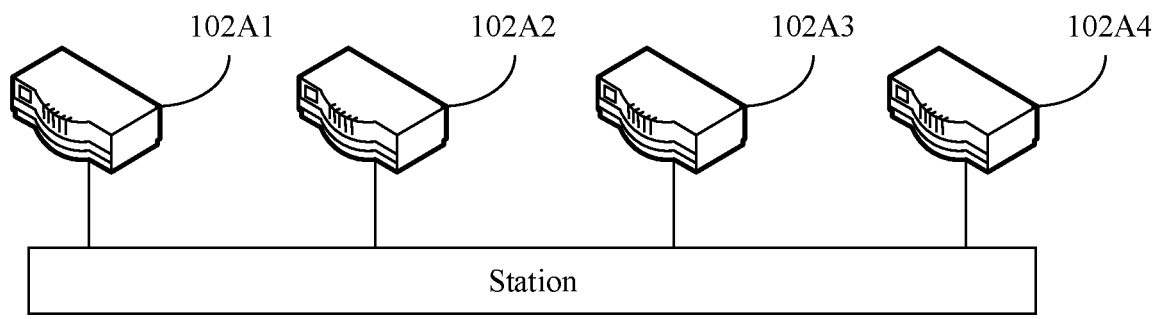
FIG. 3 is a schematic structural diagram of a communications network according to an embodiment.

For example, FIG. 3 is a schematic structural diagram of a communications network according to an embodiment. As shown in FIG. 3, the communications network is a one-layer network, and the communications network includes a plurality of network devices 102A1 to 102A4. The network devices 102A1 to 102A4 are configured to connect stations to the communications network. The network devices 102A1 to 102A4 may be top of rank (TOR) switches. The stations may be specifically various types of devices such as a host, a terminal, a server, and a virtual machine.

Figure 4:
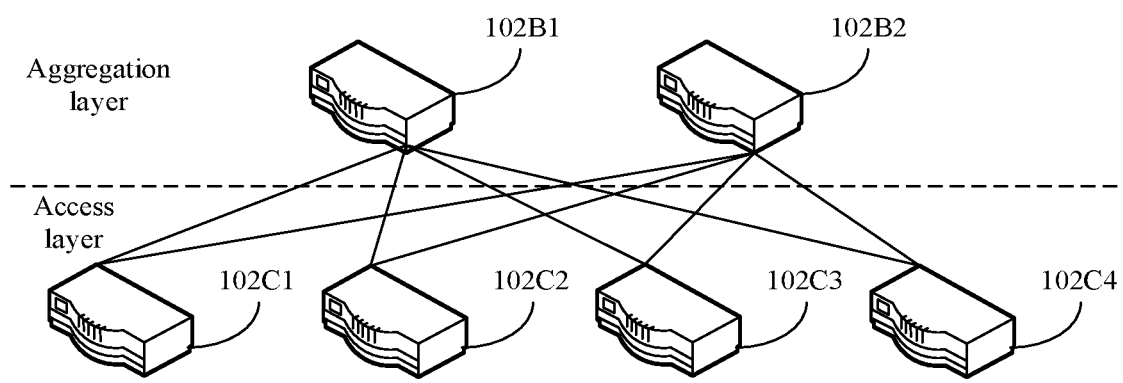
FIG. 4 is a schematic structural diagram of another communications network according to an embodiment.

For example, FIG. 4 is a schematic structural diagram of another communications network according to an embodiment. As shown in FIG. 4, the communications network is a two-layer network, and the communications network includes an aggregation layer and an access layer. The aggregation layer is the high-speed switching backbone of the communications network. The access layer is used to connect stations to the communications network. Optionally, referring to FIG. 4, the aggregation layer includes two aggregation layer network devices 102B1 and 102B2, and the access layer includes four access layer network devices 102C1 to 102C4. The communications network shown in FIG. 4 may be a fat tree or a leaf-spine topology network. In this case, the aggregation layer network devices 102B1 and 102B2 are spine switches, and the access layer network devices 102C1 to 102C4 are leaf switches. Optionally, a quantity of uplinks on each leaf switch is equal to a quantity of spine switches, and a quantity of downlinks on each spine switch is equal to a quantity of leaf switches. In other words, each spine switch is connected to all leaf switches, and each leaf switch is connected to all spine switches, that is, the spine switches are fully connected to the leaf switches.

Figure 5:
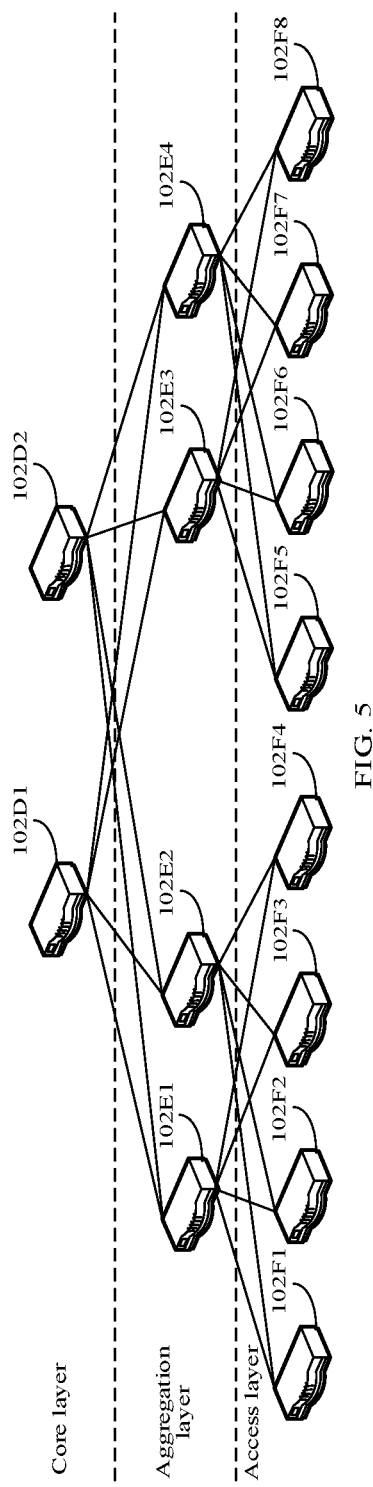
FIG. 5 is a schematic structural diagram of still another communications network according to an embodiment.

For example, FIG. 5 is a schematic structural diagram of still another communications network according to an embodiment. As shown in FIG. 5, the communications network is a three-layer network, and the communications network includes a core layer, an aggregation layer, and an access layer. The core layer is the high-speed switching backbone of the communications network. The aggregation layer is used to provide aggregation connections (connecting the access layer and the core layer). The access layer is used to connect stations to the communications network. Referring to FIG. 5, the core layer includes two core network devices 102D1 and 102D2. The aggregation layer includes four aggregation layer network devices 102E1 to 102E4, where the aggregation layer network devices 102E1 and 102E2 are classified into a first group, and the aggregation layer network devices 102E3 and 102E4 are classified into a second group. The access layer includes eight access layer network devices 102F1 to 102F8, where the four access layer network devices 102F1 to 102F4 are connected to the first group of aggregation layer network devices 102E1 and 102E2, and the other four access layer network devices 102F5 to 102F8 are connected to the second group of aggregation layer network devices 102E3 and 102E4. Optionally, the aggregation layer and the access layer of the communications network may form a leaf-spine topology network. In this case, the aggregation layer network devices 102E1 to 102E4 are spine switches, and the access layer network devices 102F1 to 102F8 are leaf switches.

The communications network provided in this embodiment performs congestion control based on an ECN mechanism. The network device includes one or more egress queues, and the egress queue is used to buffer a data packet sent by a transmit end to a receive end. Communication between the transmit end and the receive end is implemented through forwarding of data packets by the network device. Optionally, a communication process between the transmit end and the receive end in the communications network includes the following steps.

In S11, the transmit end sends a data packet to the network device.

An ECN field in an Internet Protocol (IP) header of the data packet sent by the transmit end is set to 10 or 01. In other words, the data packet sent by the transmit end supports the ECN mechanism.

In S12, the network device buffers the received data packet in a first egress queue.

Optionally, the first egress queue is any egress queue in the network device.

In S13, the network device determines, based on a queue depth of the first egress queue and an ECN threshold, whether to ECN mark the data packet in the first egress queue.

A queue depth of an egress queue is used to represent a total quantity of bytes of data packets buffered in the egress queue. A larger queue depth of the egress queue indicates larger memory space occupied by the egress queue. A transmission delay of a data packet is in a positive correlation with the queue depth of the egress queue. In other words, a larger queue depth of the egress queue indicates a larger transmission delay of the data packet.

Optionally, an ECN threshold is configured for each egress queue in the network device. ECN thresholds generally include an ECN maximum threshold and an ECN minimum threshold. When the queue depth of the egress queue is greater than the ECN maximum threshold, a probability that a data packet to be added to the egress queue is ECN marked is 1. When the queue depth of the egress queue is between the ECN minimum threshold and the ECN maximum threshold, a probability that a data packet to be added to the egress queue is ECN marked is greater than 0 and less than 1, and the probability that the data packet is ECN marked is in a positive correlation with the queue depth of the egress queue. When the queue depth of the egress queue is less than the ECN minimum threshold, a probability that a data packet to be added to the egress queue is ECN marked is 0.

Figure 6:
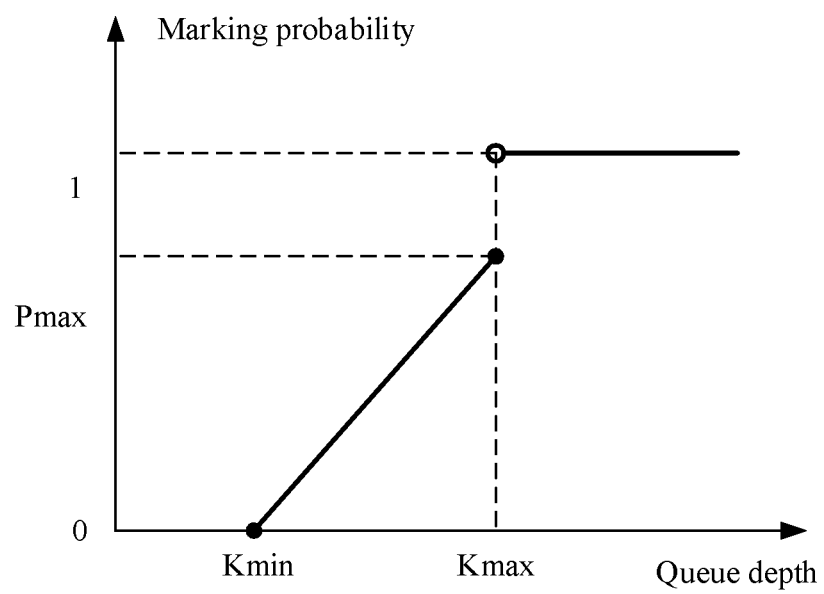
FIG. 6 is a schematic diagram of a relationship between a probability that a data packet is ECN marked and a queue depth of an egress queue according to an embodiment.

For example, FIG. 6 is a schematic diagram of a relationship between a probability that a data packet is ECN marked and a queue depth of an egress queue according to an embodiment. Kmin represents the ECN minimum threshold, Kmax represents the ECN maximum threshold, and Pmax represents an ECN marking probability. The ECN marking probability is a probability of performing, when a queue depth of an egress queue reaches the ECN maximum threshold, ECN marking on a data packet to be added to the egress queue, where $0<Pmax\leq1$. As shown in FIG. 6, when the queue depth of the egress queue is between the ECN minimum threshold and the ECN maximum threshold, a probability (which is referred to as a marking probability for short in FIG. 6) that the data packet is ECN marked is in a linear positive correlation to the queue depth of the egress queue. Certainly, when the queue depth of the egress queue is between the ECN minimum threshold and the ECN maximum threshold, the probability that the data packet is ECN marked may alternatively be in a non-linear positive correlation with the queue depth of the egress queue. This is not limited in this embodiment.

In this embodiment, an ECN configuration parameter includes an ECN threshold. Optionally, the ECN thresholds include the ECN maximum threshold and the ECN minimum threshold. When the ECN thresholds include the ECN maximum threshold and the ECN minimum threshold, the ECN configuration parameter may further include the ECN marking probability. Alternatively, the ECN configuration parameter may include only one ECN threshold, and the ECN threshold is a threshold for setting an ECN mark. When the queue depth of the egress queue does not exceed the ECN threshold, a probability that the data packet to be added to the egress queue is ECN marked is 0, that is, the data packet does not need to be ECN marked. When the queue depth of the egress queue exceeds the ECN threshold, the probability that the data packet to be added to the egress queue is ECN marked is 1, that is, each data packet needs to be ECN marked.

In S14, the network device sends the data packet in the first egress queue to the receive end.

Optionally, when receiving a data packet that is ECN marked, the receive end generates a congestion notification packet, and sends the congestion notification packet to the transmit end. Further, after receiving the congestion notification packet, the transmit end determines a sending rate of a subsequent data packet based on a quantity of received congestion notification packets. The sending rate of a subsequent data packet is negatively correlated to the quantity of congestion notification packets received by the transmit end, to avoid network congestion. When the communications network uses a Transmission Control Protocol (TCP), an ECN field in a TCP header of an acknowledgment (ACK) packet may be set to 1, and the ACK packet is used as the congestion notification packet. When the communications network uses a remote direct memory access over converged Ethernet (ROCE) protocol, the receive end may send a congestion notification packet (CNP) as the congestion notification packet to the transmit end.

It can be learned from the foregoing communication process between the transmit end and the receive end in the communications network that, a key to effective congestion control performed based on the ECN mechanism in the communications network is to determine an ECN configuration parameter, especially an ECN threshold. Because a current ECN configuration parameter is usually statically configured, when the ECN threshold is set to an excessively high value, a depth of an egress queue in the network device is relatively large. Consequently, a transmission delay of the data packet is relatively large. When the ECN threshold is set to an excessively low value, a rate at which the transmit end sends the data packet is relatively low, causing relatively low network resource utilization. In addition, a statically configured ECN threshold cannot be applicable to various communications networks or a communications network that changes in real time. Therefore, flexibility of current network congestion control is relatively low. In a congestion control method provided in the embodiments, the network device may send an ECN parameter sample to an analysis device when the network device is powered on or in a data packet forwarding process, so that the analysis device performs training by using the ECN parameter sample, to obtain an ECN inference model. Then, the analysis device sends the ECN inference model to the network device, and the network device determines an ECN configuration parameter by using the ECN inference model. In other words, the ECN inference model in the network device may be dynamically configured by the analysis device. This implements dynamic adjustment of the ECN configuration parameter and improves flexibility of network congestion control.

Figure 9:
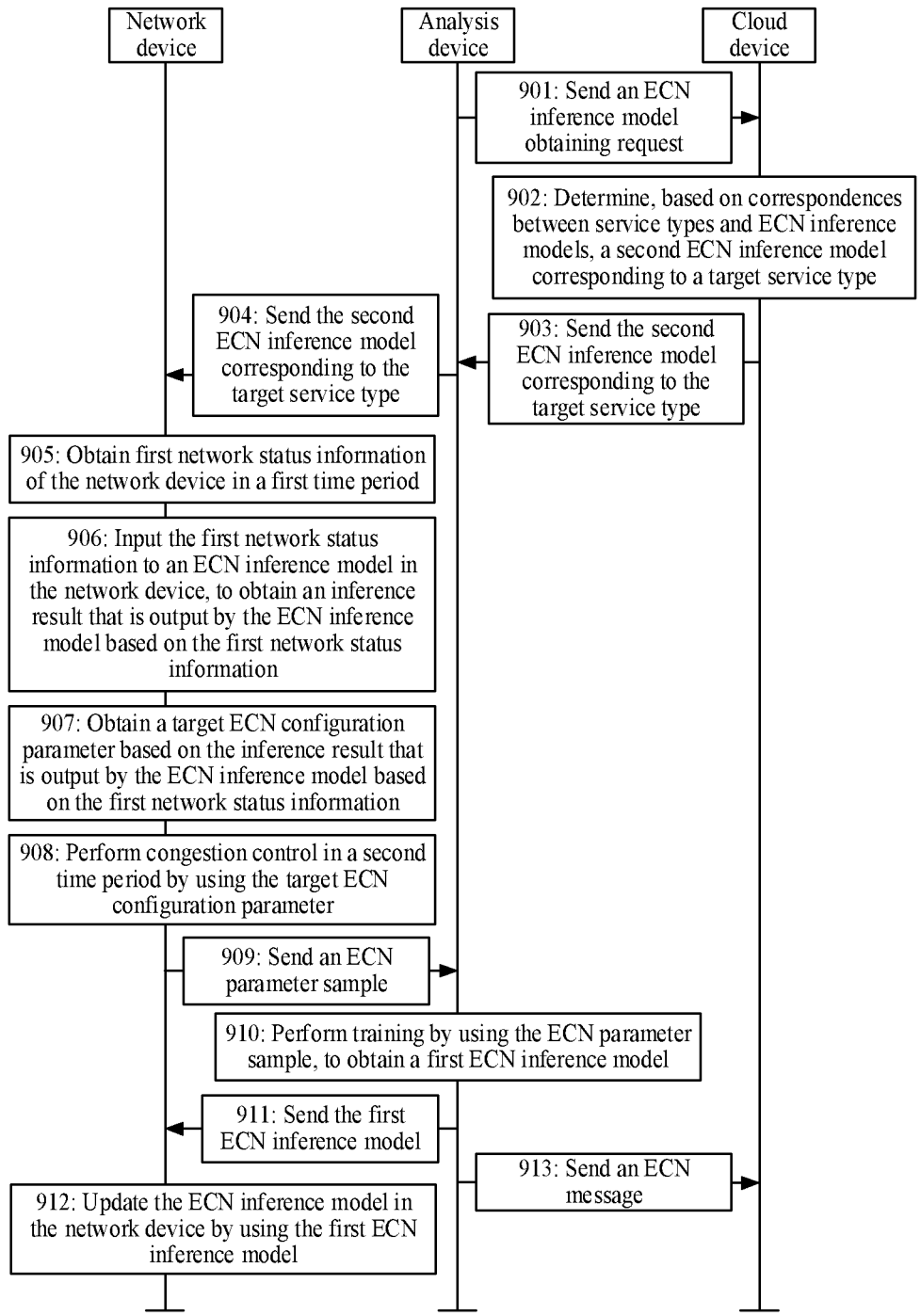
FIG. 9 is a schematic flowchart of another congestion control method according to an embodiment.

Optionally, in the congestion control system shown in FIG. 1, dynamic configuration of the ECN inference model in the network device may be implemented through data interaction between the analysis device and the network device. In the congestion control system shown in FIG. 2, dynamic configuration of the ECN inference model in the network device may be implemented through data interaction between a cloud device, the analysis device, and the network device. In the following embodiments, a congestion control method shown in FIG. 7 and a congestion control method shown in FIG. 9 are provided, and implementation processes of the methods applied to the foregoing two congestion control systems are separately described.

Figure 7:
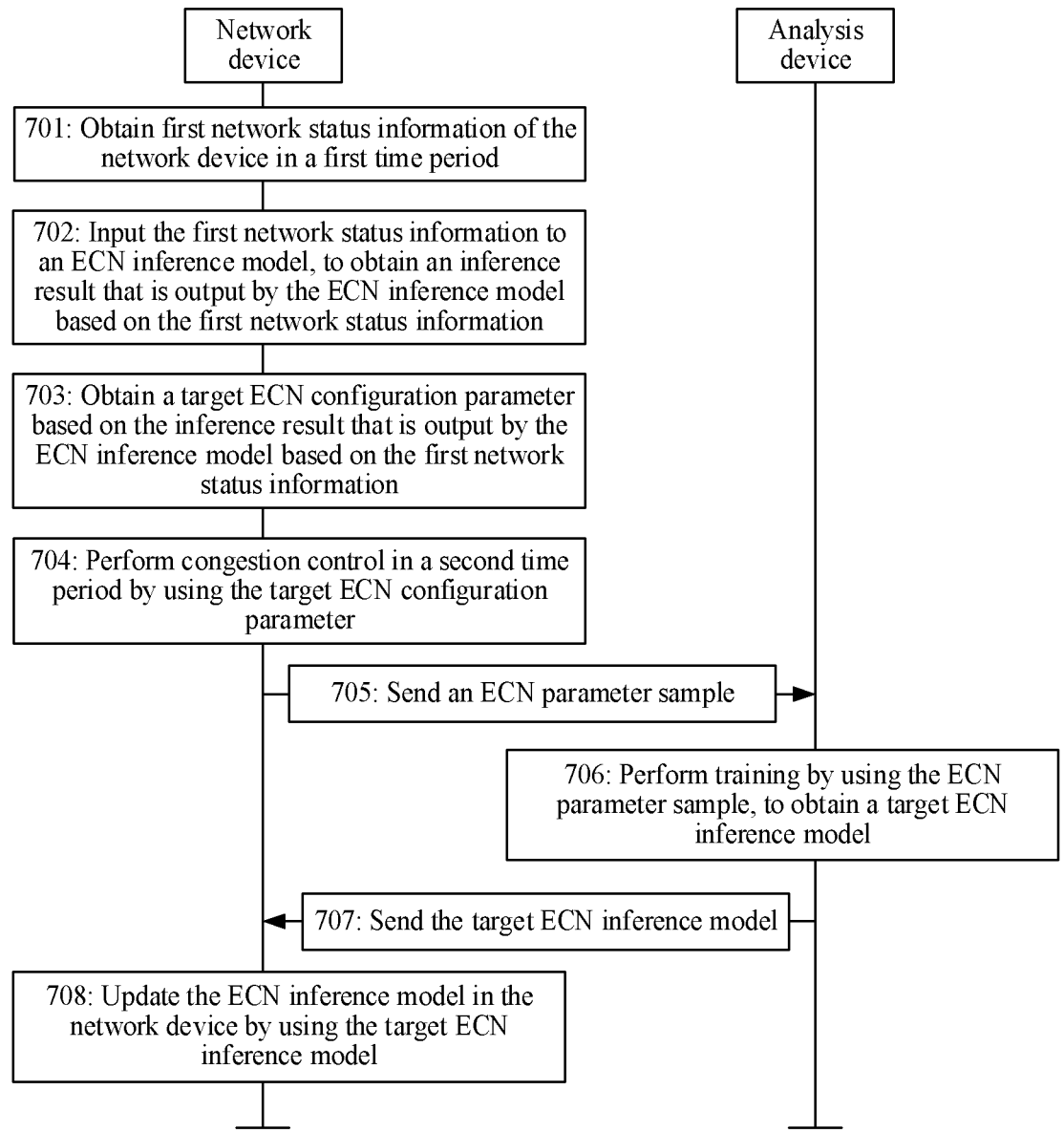
FIG. 7 is a schematic flowchart of a congestion control method according to an embodiment.

FIG. 7 is a schematic flowchart of a congestion control method according to an embodiment. The method may be applied to the congestion control system shown in FIG. 1. As shown in FIG. 7, the method includes the following steps.

Step 701: A network device obtains first network status information of the network device in a first time period.

Optionally, the first network status information includes one or more of queue information (for example, including a queue depth of an egress queue), throughput information (for example, including bandwidth utilization), and congestion information (for example, including an ECN packet ratio) of the network device in the first time period. The ECN packet ratio of the network device in the first time period is a ratio of data packets that are ECN marked and that are sent by the network device in the first time period to all data packets sent by the network device. The network device may periodically obtain network status information of the network device. For example, the network device may obtain the network status information of the network device once every several microseconds. The first time period may be a past time period.

For example, a queue depth of an egress queue of the network device in the first time period is 1 KB (kilobyte), bandwidth utilization is 90%, and an ECN packet ratio is 0.5%.

Step 702: The network device inputs the first network status information to an ECN inference model, to obtain an inference result that is output by the ECN inference model based on the first network status information.

The inference result includes an original ECN configuration parameter and confidence of the original ECN configuration parameter. In this embodiment, an ECN configuration parameter that is output by the ECN inference model based on the input network status information is referred to as the original ECN configuration parameter.

Optionally, the ECN inference model is an initial ECN inference model preconfigured for the network device before delivery. Alternatively, the ECN inference model is an ECN inference model sent by an analysis device to the network device. In this embodiment, that the analysis device sends the ECN inference model to the network device includes: The analysis device sends complete ECN inference model data to the network device, where the complete ECN inference model data includes model structure data, model parameter data, and the like. Alternatively, the analysis device sends model parameter data and/or a model parameter variable and the like of the ECN inference model to the network device. The ECN inference model may be a machine learning model.

The ECN inference model is essentially a classification model. The ECN inference model may output a plurality of categories and a probability corresponding to each category. The probability corresponding to the category is used to reflect confidence of the category. Each category includes a group of ECN configuration parameters. In other words, the ECN inference model may output a plurality of groups of ECN configuration parameters and a probability of each group of ECN configuration parameters. In this embodiment, it is assumed that the probability corresponding to the ECN configuration parameter is positively correlated with confidence of the ECN configuration parameter. In this case, the network device may select, as the original ECN configuration parameter, a group of ECN configuration parameters with a maximum probability output by the ECN inference model, and use a probability corresponding to the original ECN configuration parameter as the confidence of the original ECN configuration parameter.

Optionally, the confidence of the original ECN configuration parameter may be represented by a number. A confidence threshold may be preset in the network device. The network device uses, as the confidence of the original ECN configuration parameter, the probability corresponding to the original ECN configuration parameter output by the ECN inference model, and then compares the confidence of the original ECN configuration parameter with the confidence threshold.

Alternatively, the confidence of the original ECN configuration parameter may be described as "high" and "low" in a coarse-grained manner. In this case, high confidence of the original ECN configuration parameter indicates that the confidence of the original ECN configuration parameter is higher than or equal to the confidence threshold. Low confidence of the original ECN configuration parameter indicates that the confidence of the original ECN configuration parameter is lower than the confidence threshold. For example, when the probability corresponding to the original ECN configuration parameter output by the ECN inference model is greater than or equal to a probability threshold, it is determined that the confidence of the original ECN configuration parameter is high. When the probability corresponding to the original ECN configuration parameter output by the ECN inference model is less than a probability threshold, it is determined that the confidence of the original ECN configuration parameter is low. A value of the probability threshold may be 0.5.

The ECN configuration parameter includes an ECN threshold. Optionally, ECN thresholds include an ECN maximum threshold and an ECN minimum threshold. The ECN configuration parameter may further include an ECN marking probability. In this embodiment, an example in which the ECN configuration parameter includes the ECN maximum threshold, the ECN minimum threshold, and the ECN marking probability is used for description.

Step 703: The network device obtains a target ECN configuration parameter based on the inference result that is output by the ECN inference model based on the first network status information.

Optionally, when the confidence of the original ECN configuration parameter is less than the confidence threshold, the network device adjusts, based on a change of transmission performance of the network device, an ECN configuration parameter used by the network device in the first time period, and uses an adjusted ECN configuration parameter as the target ECN configuration parameter. Alternatively, when the confidence of the original ECN configuration parameter is greater than or equal to the confidence threshold, the network device uses the original ECN configuration parameter as the target ECN configuration parameter.

Optionally, an implementation process in which the network device adjusts, based on the change of transmission performance of the network device, the ECN configuration parameter used by the network device in the first time period includes the following:

When transmission performance of the network device in the first time period is improved compared with transmission performance of the network device in a third time period, the network device increases an ECN threshold in the ECN configuration parameter used by the network device in the first time period; and/or, lowers an ECN marking probability in the ECN configuration parameter used by the network device in the first time period. Alternatively, when transmission performance of the network device in the first time period deteriorates compared with transmission performance of the network device in a third time period, the network device lowers an ECN threshold in the ECN configuration parameter used by the network device in the first time period, and/or increases an ECN marking probability in the ECN configuration parameter used by the network device in the first time period. The third time period is earlier than the first time period in time sequence. The ECN marking probability is a probability of performing, when a queue depth of an egress queue reaches the ECN maximum threshold, ECN marking on a data packet to be added to the egress queue.

Optionally, the third time period and the first time period may be adjacent time periods. In other words, an end time point of the third time period is a start time point of the first time period. Alternatively, the third time period may not be adjacent to the first time period. In other words, an end time point of the third time period is earlier than a start time point of the first time period in time sequence. Duration of the third time period may be the same as or different from duration of the first time period. For example, when the network device periodically obtains the network status information of the network device, the third time period and the first time period may be two adjacent periods.

Optionally, transmission performance of the network device is determined by the network status information. In a same or similar network environment, higher bandwidth utilization of the network device, a smaller queue depth of the egress queue of the network device, and/or a smaller ECN packet ratio of the network device indicate better transmission performance of the network device. In this embodiment, when bandwidth utilization of the network device in the first time period is higher than bandwidth utilization of the network device in the third time period, a queue depth of the network device in the first time period is less than a queue depth of the network device in the third time period; and/or when an ECN packet ratio of the network device in the first time period is less than an ECN packet ratio of the network device in the third time period, the network device may determine that transmission performance of the network device in the first time period is improved compared with transmission performance of the network device in the third time period.

For example, when the bandwidth utilization of the network device in the first time period is greater than the bandwidth utilization of the network device in the third time period, the network device may increase the ECN threshold used in the first time period by 5% and/or lower the ECN marking probability used in the first time period by 1%, to obtain the target ECN configuration parameter. When the bandwidth utilization of the network device in the first time period is less than the bandwidth utilization of the network device in the third time period, the network device may lower the ECN threshold used in the first time period by 5% and/or increase the ECN marking probability used in the first time period by 1%, to obtain the target ECN configuration parameter.

Step 704: The network device performs congestion control in a second time period by using the target ECN configuration parameter.

The second time period is later than the first time period in time sequence. The first time period and the second time period may be adjacent time periods. In other words, an end time point of the first time period is a start time point of the second time period. Alternatively, the first time period may not be adjacent to the second time period. In other words, an end time point of the first time period is earlier than a start time point of the second time period in time sequence. Duration of the first time period may be the same as or different from duration of the second time period. For example, when the network device periodically obtains the network status information of the network device, the first time period and the second time period may be two adjacent periods. That the network device performs congestion control in the second time period by using the target ECN configuration parameter means that the network device sets the ECN configuration parameter to the target ECN configuration parameter in the second time period, to forward a data packet.

In this embodiment, the target ECN configuration parameter is an original ECN configuration parameter whose confidence is greater than or equal to the confidence threshold. Alternatively, the target ECN configuration parameter is an ECN configuration parameter obtained after transmission performance optimization adjustment is performed on the ECN configuration parameter used by the network device in the first time period. Therefore, the network device performs congestion control in the second time period by using the target ECN configuration parameter, to ensure reliability of transmission performance of the network device and congestion control, and ensure reliability of network running.

Step 705: The network device sends an ECN parameter sample to the analysis device.

The ECN parameter sample includes the first network status information and a target ECN configuration parameter corresponding to the first network status information. The target ECN configuration parameter is obtained based on the inference result that is output by the ECN inference model. In other words, the target ECN configuration parameter is the original ECN configuration parameter whose confidence is greater than or equal to the confidence threshold. Alternatively, the target ECN configuration parameter is the ECN configuration parameter obtained after transmission performance optimization adjustment is performed on the ECN configuration parameter used by the network device in the first time period.

Optionally, the first network status information includes the queue depth of the egress queue, the bandwidth utilization, and the ECN packet ratio of the network device in the first time period. For example, assuming that the queue depth of the egress queue of the network device in the first time period is 1 KB, the bandwidth utilization is 90%, the ECN packet ratio is 0.5%, the ECN maximum threshold in the target ECN configuration parameter is 100 KB, the ECN minimum threshold is 1 KB, and the ECN marking probability is 5%, content of the ECN parameter sample may be shown in Table 1.

TABLE 1

| Queue depth | Bandwidth utilization | ECN packet ratio | ECN minimum threshold | ECN maximum threshold | ECN marking probability |
|---|---|---|---|---|---|
| 1 KB | 90% | 0.5% | 1 KB | 100 KB | 5% |

In this embodiment, transmission performance can be ensured when the network device performs, in a network state corresponding to the first network status information, congestion control by using the target ECN configuration parameter. Therefore, the first network status information and the target ECN configuration parameter corresponding to the first network status information is used as the ECN parameter sample. This can ensure reliability of a subsequent ECN inference model obtained after the analysis device performs training by using the ECN parameter sample.

Optionally, when the confidence of the original ECN configuration parameter is less than the confidence threshold, the network device may further send target indication information to the analysis device. The target indication information includes an identifier of the network device. The target indication information is used to indicate that the ECN inference model in the network device does not adapt to the network device. The identifier of the network device may be information that can uniquely identify the network device, such as a media access control (MAC) address or a hardware address of the network device. Optionally, the target indication information includes the confidence of the original ECN configuration parameter.

Step 706: The analysis device performs training by using the ECN parameter sample, to obtain a target ECN inference model.

Optionally, after receiving a plurality of ECN parameter samples sent by the network device managed by the analysis device, the analysis device performs training by using the plurality of ECN parameter samples, to obtain the target ECN inference model. The plurality of ECN parameter samples may be sent by one network device managed by the analysis device, or may be sent by a plurality of network devices managed by the analysis device. The analysis device may input the plurality of ECN parameter samples into a model trainer, and the model trainer outputs the target ECN inference model. Alternatively, the analysis device pre-stores an initial ECN inference model, and the analysis device performs incremental training (or retraining) on the initial ECN inference model by using the newly received ECN parameter sample, to obtain the target ECN inference model. An input of the target ECN inference model is the network status information, and an output of the target ECN inference model is the ECN configuration parameter and the confidence of the ECN configuration parameter.

Optionally, when an ECN inference model update condition is met, the analysis device performs training by using the ECN parameter sample, to obtain the target ECN inference model. The ECN inference model update condition includes the following: a quantity of network devices that send the target indication information to the analysis device reaches a device quantity threshold, an accumulated quantity of times the analysis device receives the target indication information within first duration reaches a first quantity threshold, and/or a quantity of times the analysis device receives, within second duration, the target indication information sent by any network device managed by the analysis device reaches a second quantity threshold. The target indication information includes the identifier of the network device that sends the target indication information, and the target indication information is used to indicate that the ECN inference model in the network device that sends the target indication information does not adapt to the network device.

Optionally, the device quantity threshold is an integer greater than 1. For example, a value of the device quantity threshold may be 2, 6, 7, or the like. A specific value of the device quantity threshold is not limited in this embodiment. When the quantity of network devices that send the target indication information to the analysis device reaches the device quantity threshold, it indicates that in a network managed by the analysis device, ECN inference models in a plurality of network devices do not adapt to the network devices. When the accumulated quantity of times the analysis device receives the target indication information within the first duration reaches the first quantity threshold, and/or the quantity of times the analysis device receives, within the second duration, the target indication information sent by any network device managed by the analysis device reaches the second quantity threshold, it indicates that in the network managed by the analysis device, ECN configuration parameters in one or more network devices usually have low confidence. This further reflects that when the network device adjusts the ECN configuration parameter based on transmission performance, the network device may fail to obtain an ECN configuration parameter that can improve transmission performance of the network device.

In this embodiment, when ECN inference models in a plurality of network devices in the network managed by the analysis device do not adapt to the network devices, and/or when the network device adjusts the ECN configuration parameter based on transmission performance, the network device may fail to obtain an ECN configuration parameter that can improve transmission performance of the network device, the analysis device performs training by using the ECN parameter sample sent by the network device, to obtain a target ECN inference model. Otherwise, the analysis device does not need to perform training to obtain an ECN inference model. In this way, reliability of the ECN inference model in the network device managed by the analysis device is ensured, and a quantity of times the analysis device updates the ECN inference model is reduced, thereby saving computing resources of the analysis device.

Step 707: The analysis device sends the target ECN inference model to the network device.

Optionally, when the analysis device receives the target indication information sent by the network device, the analysis device sends the target ECN inference model to the network device. In other words, the analysis device sends the target ECN inference model to the network device that has sent the target indication information. In this embodiment, if the network device does not send the target indication information to the analysis device, it indicates that performance of the ECN inference model in the network device is relatively good. In this case, the analysis device may not send the target ECN inference model to the network device, to save processing resources of the network device and transmission resources. Alternatively, after obtaining the target ECN inference model through training, the analysis device may send the target ECN inference model to each network device managed by the analysis device, to facilitate management of each network device. The target ECN inference model sent by the analysis device to the network device may be complete model data of the target ECN inference model, model parameter data of the target ECN inference model, or a model parameter variable of the target ECN inference model relative to the ECN inference model in the network device. Specific content of the target ECN inference model sent by the analysis device to the network device is not limited in this embodiment.

Step 708: The network device updates the ECN inference model in the network device by using the target ECN inference model.

The target ECN inference model received by the network device is an updated ECN inference model relative to the original ECN inference model in the network device. Optionally, when the network device receives the complete model data that is of the updated ECN inference model and that is sent by the analysis device, the network device may directly use the updated ECN inference model to replace the original ECN inference model in the network device. When the network device receives the model parameter data sent by the analysis device, the network device replaces model parameter data of the ECN inference model in the network device with the model parameter data sent by the analysis device, to obtain an updated ECN inference model. When the network device receives the model parameter variable sent by the analysis device, the network device modifies model parameter data of the ECN inference model in the network device by using the model parameter variable, to obtain an updated ECN inference model. For example, when a value of a model parameter in the network device is a, and a received variation corresponding to the model parameter is +b, the network device modifies the value of the model parameter, to obtain an updated value a+b of the model parameter. Then, the network device obtains a new ECN configuration parameter based on the updated ECN inference model.

In this embodiment, the network device updates the ECN inference model in the network device by using the ECN inference model sent by the analysis device. In other words, the network device uses the updated ECN inference model as the ECN inference model in the network device, and then may perform the foregoing step 701 to step 708 again. In a network running process, the network device sends the ECN parameter sample to the analysis device, and the analysis device sends, to the network device, an ECN inference model obtained through training performed based on the ECN parameter sample. Then, the network device sends a new ECN parameter sample to the analysis device based on the updated ECN inference model, and the analysis device sends, to the network device, an ECN inference model obtained through training performed based on the new ECN parameter sample. This implements dynamic configuration of the ECN inference model in the network device, and implements dynamic adjustment of the ECN configuration parameter.

Figure 8:
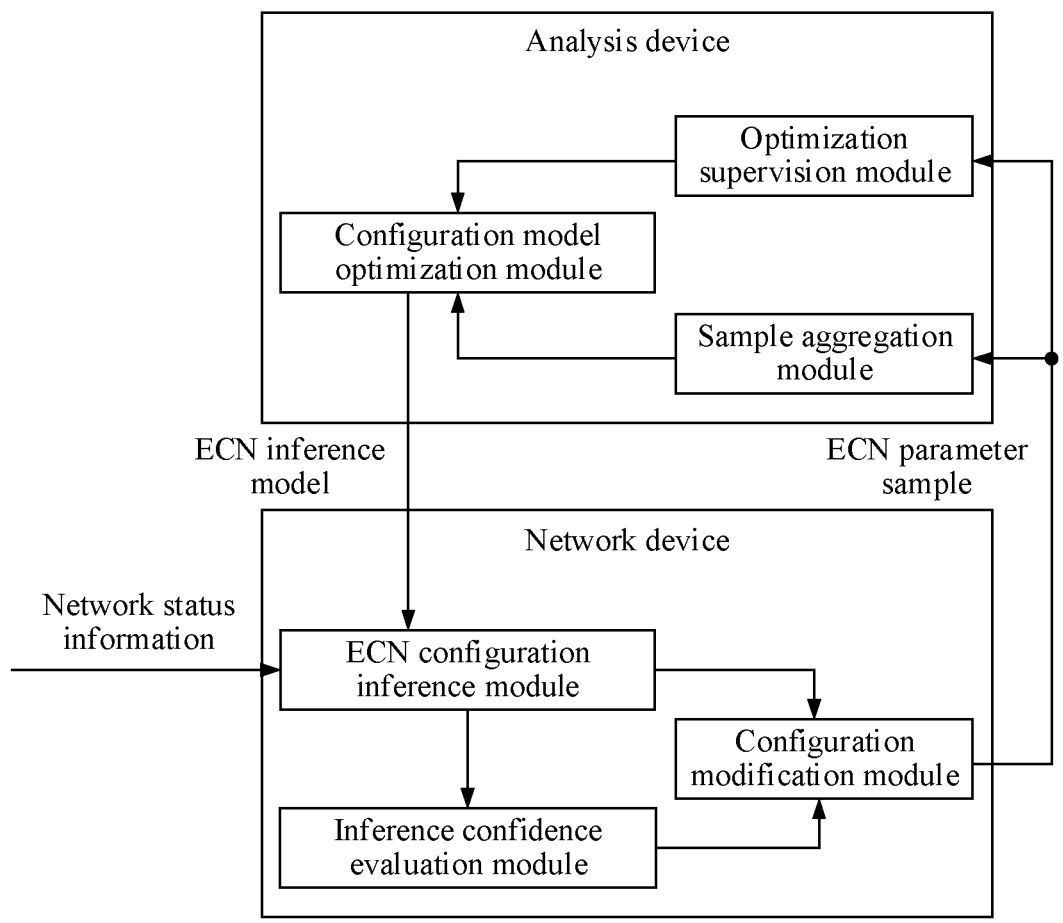
FIG. 8 is a schematic diagram of data interaction between an analysis device and a network device according to an embodiment.

For example, FIG. 8 is a schematic diagram of data interaction between an analysis device and a network device according to an embodiment. As shown in FIG. 8, the analysis device includes a configuration model optimization module, an optimization supervision module, and a sample aggregation module. The sample aggregation module is configured to aggregate and sort out data sent by the network device, including an ECN parameter sample, target indication information, and the like. The optimization supervision module is configured to evaluate whether an ECN inference model update condition is met. The configuration model optimization module is configured to: after the optimization supervision module determines that the ECN inference model update condition is met, update an existing ECN inference model based on the data in the sample aggregation module, and send an optimized ECN inference model to the network device. The network device includes an ECN configuration inference module, an inference confidence evaluation module, and a configuration modification module. The ECN configuration inference module is configured to: collect network status information, and input the network status information into the ECN inference model, to obtain an ECN configuration parameter and confidence that are output by the ECN inference model. The inference confidence evaluation module is configured to evaluate the confidence of the ECN configuration parameter output by the ECN inference model. The configuration modification module is configured to: when the confidence of the ECN configuration parameter output by the ECN inference model is less than a confidence threshold, adjust the ECN configuration parameter based on a change of transmission performance of the network device, and send an ECN parameter sample to the analysis device.

In conclusion, in a congestion control method provided in the embodiments, the network device sends the ECN parameter sample to the analysis device, so that the analysis device performs training by using the ECN parameter sample, to obtain a target ECN inference model. Then, the analysis device sends the target ECN inference model to the network device, and the network device determines a new ECN configuration parameter by using the target ECN inference model. In other words, the analysis device may dynamically configure the ECN inference model in the network device. This implements dynamic adjustment of the ECN configuration parameter in the network device and improves flexibility of network congestion control.

Optionally, when ECN inference models in a plurality of network devices in a network managed by the analysis device do not adapt to the network devices, and/or when the network device adjusts the ECN configuration parameter based on transmission performance, the network device may fail to obtain an ECN configuration parameter that can improve transmission performance of the network device, the analysis device performs training by using the ECN parameter sample sent by the network device, to obtain a target ECN inference model. Otherwise, the analysis device does not need to perform training to obtain an ECN inference model. In this way, reliability of the ECN inference model in the network device managed by the analysis device is ensured, and a quantity of times the analysis device updates the ECN inference model is reduced, thereby saving computing resources of the analysis device. In addition, the analysis device may further send the target ECN inference model only to a network device including an ECN inference model that outputs an ECN configuration parameter whose confidence is less than the confidence threshold. This saves transmission resources and saves processing resources of a network device including an ECN inference model that outputs an ECN configuration parameter whose confidence is greater than or equal to the confidence threshold.

FIG. 9 is a schematic flowchart of another congestion control method according to an embodiment. The method may be applied to the congestion control system shown in FIG. 2. As shown in FIG. 9, the method includes the following steps.

Step 901: An analysis device sends an ECN inference model obtaining request to a cloud device.

The ECN inference model obtaining request includes a target service type carried in a network managed by the analysis device. Optionally, the analysis device may be any analysis device managed by the cloud device. The ECN inference model obtaining request may further include an identifier of the analysis device. The identifier of the analysis device may be information that can uniquely identify the analysis device, such as a MAC address or a hardware address of the analysis device.

Optionally, the analysis device may send the ECN inference model obtaining request to the cloud device in an initial phase of network deployment, to request to obtain an initial ECN inference model that needs to be configured in the network managed by the analysis device. Alternatively, when confidence of an ECN configuration parameter of the network device is usually low in the network managed by the analysis device, the analysis device may send the ECN inference model obtaining request to the cloud device. A trigger condition under which the analysis device sends the ECN inference model obtaining request to the cloud device is not limited in this embodiment.

Step 902: The cloud device determines, based on correspondences between service types and ECN inference models, a second ECN inference model corresponding to the target service type.

The correspondences include a plurality of service types and a plurality of ECN inference models that are in a one-to-one correspondence. For example, the correspondences stored in the cloud device include: a distributed storage service and an ECN inference model corresponding to the distributed storage service; a high-performance computing service and an ECN inference model corresponding to the high-performance computing service; and an AI inference service and an ECN inference model corresponding to the AI inference service.

Optionally, the cloud device receives ECN messages sent by a plurality of analysis devices managed by the cloud device. The ECN messages each include a first ECN inference model in the analysis device and an identifier of a service type corresponding to the first ECN inference model. The cloud device generates the correspondences based on the ECN messages sent by the plurality of analysis devices. For a manner of obtaining the first ECN inference model in the ECN message sent by the analysis device, refer to the manner of obtaining the target ECN inference model in step 706. Details are not described herein again in this embodiment.

In this embodiment, the ECN inference model obtained by the analysis device through training is referred to as the first ECN inference model. In other words, the ECN inference model included in the ECN message sent by the analysis device to the cloud device is the first ECN inference model. The ECN inference model obtained by the cloud device through training is referred to as the second ECN inference model. In other words, the ECN inference model sent by the cloud device to the analysis device is the second ECN inference model.

Optionally, an implementation process in which the cloud device generates the correspondence based on the ECN messages sent by the plurality of analysis devices may include: The cloud device classifies first ECN inference models in the plurality of ECN messages based on service types, to obtain one or more model classes. First ECN inference models in a same model class correspond to a same service type. For each model class including a plurality of first ECN inference models, the cloud device performs model iteration processing on the plurality of first ECN inference models in the model class, to obtain one second ECN inference model corresponding to the model class. That the cloud device performs model iteration processing on the plurality of first ECN inference models may include: performing model structure optimization on the plurality of first ECN inference models, and/or adjusting model parameters based on model parameter data of the plurality of first ECN inference models, and so on, to finally obtain one second ECN inference model. For example, an average value or a median value of same model parameters in the plurality of first ECN inference models may be obtained.

For example, it is assumed that the cloud device receives ECN messages sent by five analysis devices, and the five analysis devices are analysis devices 1 to 5. A service type carried in a network managed by the analysis device 1 is a service type 1, a service type carried in a network managed by the analysis device 2 is a service type 2, a service type carried in a network managed by the analysis device 3 is a service type 1, a service type carried in a network managed by the analysis device 4 is a service type 1, and a service type carried in a network managed by the analysis device 5 is a service type 2. In this case, the cloud device classifies, as a model class, ECN inference models sent by the analysis device 1, the analysis device 3, and the analysis device 4, and classifies, as another model class, ECN inference models sent by the analysis device 2 and the analysis device 5. Model iteration processing is separately performed on ECN inference models in the two model classes, to finally obtain an ECN inference model (referred to as an ECN inference model 1) corresponding to the service type 1 and an ECN inference model (referred to as an ECN inference model 2) corresponding to the service type 2.

Step 903: The cloud device sends, to the analysis device, the second ECN inference model corresponding to the target service type.

For example, referring to the example in step 902, assuming that the target service type is the service type 1, the cloud device sends the ECN inference model 1 to the analysis device. Optionally, after receiving the ECN inference model sent by the cloud device, the analysis device replaces an original ECN inference model with the ECN inference model, that is, updates the ECN inference model in the analysis device.

Step 904: The analysis device sends, to the network device, the second ECN inference model corresponding to the target service type.

Optionally, the analysis device may send the second ECN inference model to some or all network devices managed by the analysis device. For example, when the second ECN inference model is used as an initial ECN inference model that needs to be configured in the network managed by the analysis device, the analysis device may send the second ECN inference model to all the network devices managed by the analysis device.

In this embodiment, the cloud device may determine, based on ECN information sent by the analysis device managed by the cloud device, ECN inference models corresponding to one or more service types. The analysis device may obtain, from the cloud device, the ECN inference model corresponding to the service type carried in the network managed by the analysis device, and then send the ECN inference model to the network device managed by the analysis device. This implements dynamic configuration of the ECN inference model in the network device, implements dynamic adjustment of the ECN configuration parameter, and improves flexibility of network congestion control. In addition, the ECN inference model corresponding to each service type is stored in the cloud device. This provides a sound initial ECN inference model for new network deployment or a networking change in the future.

Optionally, after receiving the second ECN inference model sent by the analysis device, the network device updates an original ECN inference model in the network device by using the second ECN inference model.

Step 905: The network device obtains first network status information of the network device in a first time period.

Step 906: The network device inputs the first network status information to the ECN inference model in the network device, to obtain an inference result that is output by the ECN inference model based on the first network status information.

Step 907: The network device obtains a target ECN configuration parameter based on the inference result that is output by the ECN inference model based on the first network status information.

Step 908: The network device performs congestion control in a second time period by using the target ECN configuration parameter.

Step 909: The network device sends an ECN parameter sample to the analysis device.

Step 910: The analysis device performs training, by using the ECN parameter sample, to obtain the first ECN inference model.

Step 911: The analysis device sends the first ECN inference model to the network device.

Step 912: The network device updates the ECN inference model in the network device by using the first ECN inference model.

For an implementation process and a related explanation of step 905 to step 912, refer to the implementation process and the related explanation of step 701 to step 708. Details are not described herein again in this embodiment.

Step 913: The analysis device sends the ECN message to the cloud device.

The ECN message includes the first ECN inference model and the identifier of the service type corresponding to the first ECN inference model. Optionally, the ECN message further includes networking information of a network managed by the network device.

After receiving the ECN message sent by the analysis device, the cloud device classifies the first ECN inference model based on the identifier of the service type in the ECN message, and re-performs model iteration processing on an updated model class, to obtain a new second ECN inference model corresponding to the model class.

For example, it is assumed that the foregoing analysis device is an analysis device 6, and a service type carried in a network managed by the analysis device 6 is the service type 1. With reference to the example in step 902, the cloud device adds an ECN inference model in the ECN message sent by the analysis device 6 into the model class in which the ECN inference models sent by the analysis device 1, the analysis device 3, and the analysis device 4 are located. Then, the cloud device re-performs model iteration processing on the model class, to obtain an updated second ECN inference model corresponding to the service type 1.

In this embodiment, data transmitted between the analysis device and the cloud device includes anonymized data such as the ECN inference model and the service type, and sensitive customer data such as network status information is usually not transmitted. Therefore, network security and privacy are ensured. Certainly, the network device may directly send the ECN parameter sample to the cloud device. The cloud device performs training based on ECN parameter samples sent by a large quantity of network devices in the entire network, to obtain an ECN inference model corresponding to each service type, and then directly sends the ECN inference model to the network device.

Figure 10:
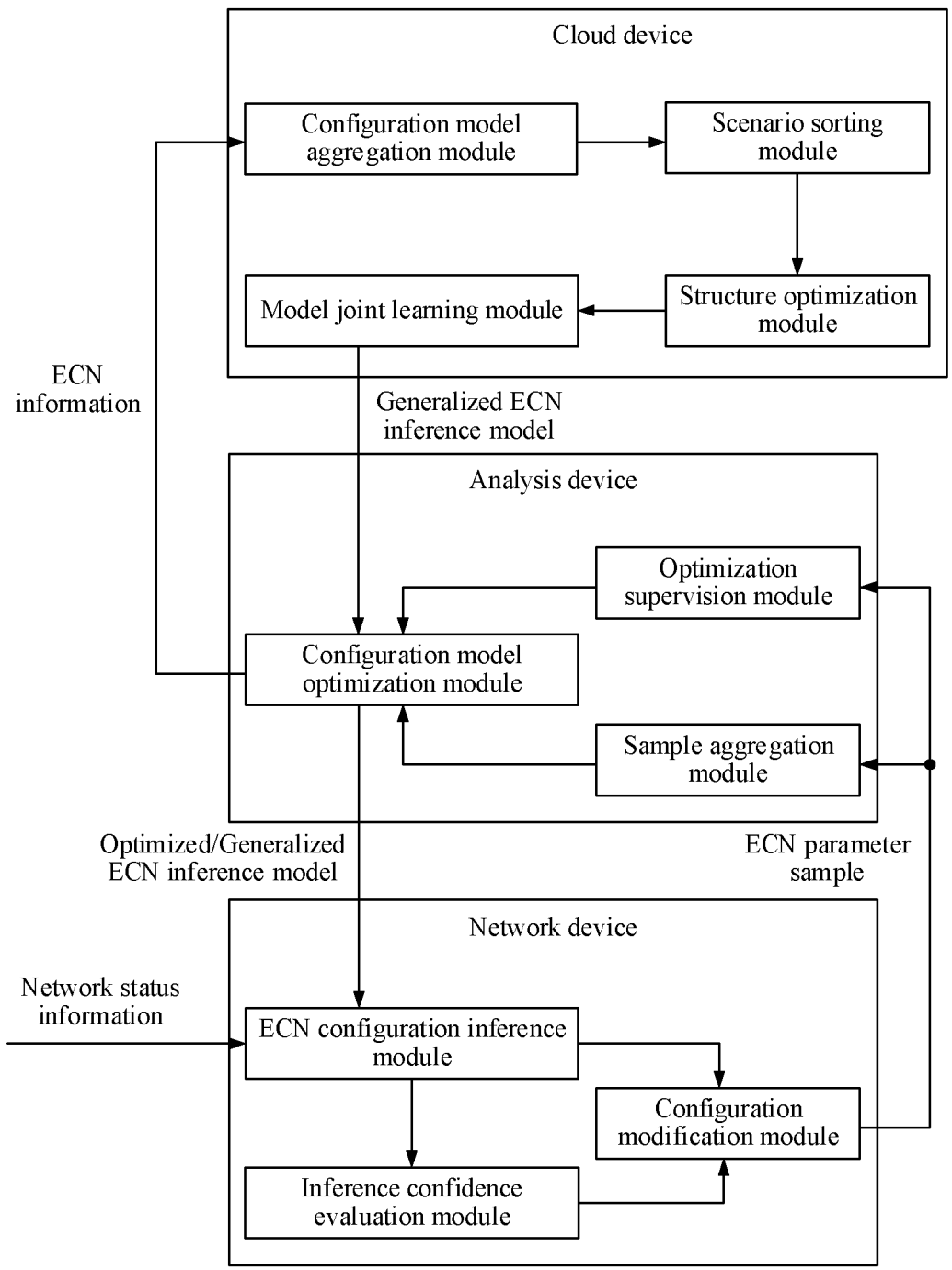
FIG. 10 is a schematic diagram of data interaction between a cloud device, an analysis device, and a network device according to an embodiment.

For example, FIG. 10 is a schematic diagram of data interaction between a cloud device, an analysis device, and a network device according to an embodiment. As shown in FIG. 10, the cloud device includes a configuration model aggregation module, a scenario sorting module, a structure optimization module, and a model joint learning module. The configuration model aggregation module is configured to collect ECN information sent by each analysis device, including an ECN inference model and a service type. The scenario sorting module is configured to classify ECN inference models based on service types, to obtain one or more model classes. The structure optimization module is configured to perform model structure optimization on the ECN inference model in the model class. The model joint learning module is configured to perform joint optimization on model parameters in a plurality of ECN inference models in a model class, and send, to the analysis device, a generalized ECN inference model corresponding to a service type carried in a network managed by the analysis device. The analysis device includes a configuration model optimization module, an optimization supervision module, and a sample aggregation module. The sample aggregation module is configured to aggregate and sort out data sent by the network device, including an ECN parameter sample, target indication information, and the like. The optimization supervision module is configured to evaluate whether an ECN inference model update condition is met. The configuration model optimization module is configured to: after the optimization supervision module determines that the ECN inference model update condition is met, update an existing ECN inference model based on the data in the sample aggregation module; and send an optimized ECN inference model to the network device, and send ECN information including the optimized inference model to the cloud device. Alternatively, the configuration model optimization module directly forwards, to the network device, the generalized ECN inference model sent by the cloud device. In other words, the configuration model optimization module may send the optimized ECN inference model or the generalized ECN inference model (optimized/generalized ECN inference model for short) to the network device. The network device includes an ECN configuration inference module, an inference confidence evaluation module, and a configuration modification module. The ECN configuration inference module is configured to: collect network status information, and input the network status information into the ECN inference model, to obtain an ECN configuration parameter and confidence that are output by the ECN inference model. The inference confidence evaluation module is configured to evaluate the confidence of the ECN configuration parameter output by the ECN inference model. The configuration modification module is configured to: when the confidence of the ECN configuration parameter output by the ECN inference model is less than a confidence threshold, adjust the ECN configuration parameter based on a change of transmission performance of the network device, and send an ECN parameter sample to the analysis device.

In conclusion, in a congestion control method provided in the embodiments, the cloud device may determine, based on the ECN information sent by the analysis device managed by the cloud device, ECN inference models corresponding to one or more service types. The analysis device may obtain, from the cloud device, the ECN inference model corresponding to the service type carried in the network managed by the analysis device, and then send the ECN inference model to the network device managed by the analysis device. This implements dynamic configuration of an ECN inference model in the network device, implements dynamic adjustment of the ECN configuration parameter, and improves flexibility of network congestion control.

In addition, the network device may send the ECN parameter sample to the analysis device, so that the analysis device performs training by using the ECN parameter sample, to obtain an ECN inference model. The analysis device sends the ECN inference model to the network device, and then the network device determines a new ECN configuration parameter by using the ECN inference model. In other words, the analysis device may dynamically configure an ECN inference model in the network device. This implements dynamic adjustment of the ECN configuration parameter in the network device and improves flexibility of network congestion control.

Optionally, the analysis device may further send the ECN information including the ECN inference model to the cloud device, so that the cloud device updates the ECN inference model corresponding to the service type, to improve reliability of the ECN inference model stored in the cloud device. The ECN inference model corresponding to each service type is stored in the cloud device. This provides a sound initial ECN inference model for new network deployment or a networking change in the future.

A sequence of steps in the congestion control method provided in the embodiments may be properly adjusted, or steps may be correspondingly added or deleted based on a situation. Any variation readily figured out by a person skilled in the art within the disclosed technical scope shall fall within the protection scope of this disclosure, and details are not described herein.

Figure 11:
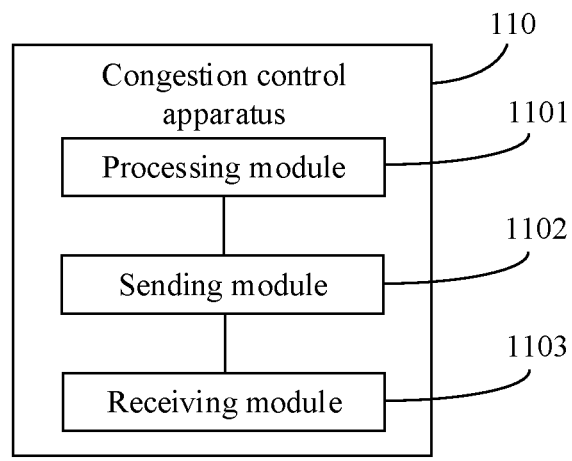
FIG. 11 is a schematic structural diagram of a congestion control apparatus according to an embodiment.

FIG. 11 is a schematic structural diagram of a congestion control apparatus according to an embodiment. The apparatus may be used in a network device in the congestion control system shown in FIG. 1 or FIG. 2. As shown in FIG. 11, the apparatus 110 includes: a processing module 1101 configured to input first network status information of the network device in a first time period into an ECN inference model, to obtain an inference result that is output by the ECN inference model based on the first network status information, where the inference result includes an original ECN configuration parameter and confidence of the original ECN configuration parameter; a sending module 1102 configured to send an ECN parameter sample to an analysis device that manages the network device, where the ECN parameter sample includes the first network status information and a target ECN configuration parameter corresponding to the first network status information, and the target ECN configuration parameter is determined based on the inference result, and a receiving module 1103 configured to receive an updated ECN inference model sent by the analysis device, where the updated ECN inference model is obtained through training performed based on the ECN parameter sample.

In conclusion, in the congestion control apparatus provided in this embodiment, the network device sends the ECN parameter sample to the analysis device through the sending module, so that the analysis device performs training by using the ECN parameter sample, to obtain the ECN inference model. Then, the analysis device sends the updated ECN inference model to the network device, and the network device may determine a new ECN configuration parameter by using the updated ECN inference model. In other words, the analysis device may dynamically configure the ECN inference model in the network device. This implements dynamic adjustment of the ECN configuration parameter in the network device and improves flexibility of network congestion control.

Optionally, the processing module 1101 is further configured to perform congestion control in a second time period by using the target ECN configuration parameter, where the second time period is later than the first time period in time sequence.

Optionally, the processing module 1101 is further configured to: when the confidence of the original ECN configuration parameter is less than a confidence threshold, adjust, based on a change of transmission performance of the network device, an ECN configuration parameter used by the network device in the first time period, and use an adjusted ECN configuration parameter as the target ECN configuration parameter.

Optionally, the processing module 1101 is further configured to: when transmission performance of the network device in the first time period is improved compared with transmission performance of the network device in a third time period, increase an ECN threshold in the ECN configuration parameter used by the network device in the first time period, and/or lower an ECN marking probability in the ECN configuration parameter used by the network device in the first time period; or when transmission performance of the network device in the first time period deteriorates compared with transmission performance of the network device in a third time period, lower an ECN threshold in the ECN configuration parameter used by the network device in the first time period, and/or increase an ECN marking probability in the ECN configuration parameter used by the network device in the first time period. The third time period is earlier than the first time period in time sequence. The ECN marking probability is a probability of performing, when a queue depth of an egress queue reaches an ECN maximum threshold, ECN marking on a data packet to be added to the egress queue.

Optionally, the processing module 1101 is further configured to: when bandwidth utilization of the network device in the first time period is higher than bandwidth utilization of the network device in the third time period, determine that a queue depth of the network device in the first time period is less than a queue depth of the network device in the third time period; and/or when an ECN packet ratio of the network device in the first time period is less than an ECN packet ratio of the network device in the third time period, determine that transmission performance of the network device in the first time period is improved compared with transmission performance of the network device in the third time period.

Optionally, the processing module 1101 is further configured to: when the confidence of the original ECN configuration parameter is greater than or equal to the confidence threshold, use the original ECN configuration parameter as the target ECN configuration parameter.

Optionally, the sending module 1102 is further configured to: when the confidence of the original ECN configuration parameter is less than the confidence threshold, send target indication information to the analysis device. The target indication information includes an identifier of the network device, and the target indication information is used to indicate that the ECN inference model in the network device does not adapt to the network device.

Optionally, the target indication information includes the confidence of the original ECN configuration parameter.

Optionally, the processing module 1101 is further configured to update the ECN inference model in the network device by using the updated ECN inference model.

Optionally, the first network status information includes one or more of queue information, throughput information, and congestion information of the network device in the first time period.

In conclusion, in the congestion control apparatus provided in this embodiment, the network device sends the ECN parameter sample to the analysis device through the sending module, so that the analysis device performs training by using the ECN parameter sample, to obtain the ECN inference model. Then, the analysis device sends the updated ECN inference model to the network device, and the network device may determine a new ECN configuration parameter by using the updated ECN inference model. In other words, the analysis device may dynamically configure the ECN inference model in the network device. This implements dynamic adjustment of the ECN configuration parameter in the network device and improves flexibility of network congestion control. In addition, the network device may send the target indication information to the analysis device through the sending module, to notify the analysis device that the ECN inference model in the network device does not adapt to the network device, so that the analysis device can effectively update the ECN inference model in the network device in a timely manner, thereby improving update flexibility of the ECN inference model in the network device.

Figure 12:
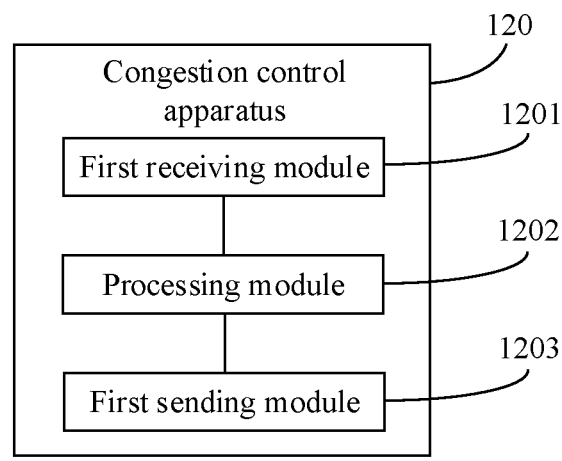
FIG. 12 is a schematic structural diagram of another congestion control apparatus according to an embodiment.

FIG. 12 is a schematic structural diagram of another congestion control apparatus according to an embodiment. The apparatus may be used in an analysis device in the congestion control system shown in FIG. 1 or FIG. 2. As shown in FIG. 12, the apparatus 120 includes: a first receiving module 1201 configured to receive an ECN parameter sample sent by a network device managed by the analysis device, where the ECN parameter sample includes network status information of the network device and a target ECN configuration parameter corresponding to the network status information; a processing module 1202 configured to perform training by using the ECN parameter sample, to obtain a first ECN inference model; and a first sending module 1203 configured to send the first ECN inference model to the network device.

In conclusion, in the congestion control apparatus provided in this embodiment, the analysis device receives, through the first receiving module, the ECN parameter sample sent by the network device; performs training by using the ECN parameter sample through the processing module, to obtain an ECN inference model; and then sends an updated ECN inference model to the network device through the first sending module. Then, the network device may determine a new ECN configuration parameter by using the updated ECN inference model. In other words, the analysis device may dynamically configure an ECN inference model in the network device. This implements dynamic adjustment of the ECN configuration parameter in the network device and improves flexibility of network congestion control.

Optionally, the processing module 1202 is configured to: when an ECN inference model update condition is met, perform training by using the ECN parameter sample, to obtain the first ECN inference model. The ECN inference model update condition includes the following: a quantity of network devices that send target indication information to the analysis device reaches a device quantity threshold, an accumulated quantity of times the analysis device receives the target indication information within first duration reaches a first quantity threshold, and/or a quantity of times the analysis device receives, within second duration, the target indication information sent by any network device managed by the analysis device reaches a second quantity threshold. The target indication information includes an identifier of the network device that sends the target indication information, and the target indication information is used to indicate that an ECN inference model in the network device that sends the target indication information does not adapt to the network device.

Optionally, the first sending module 1203 is configured to: when the analysis device receives the target indication information sent by the network device, send the first ECN inference model to the network device.

Figure 13:
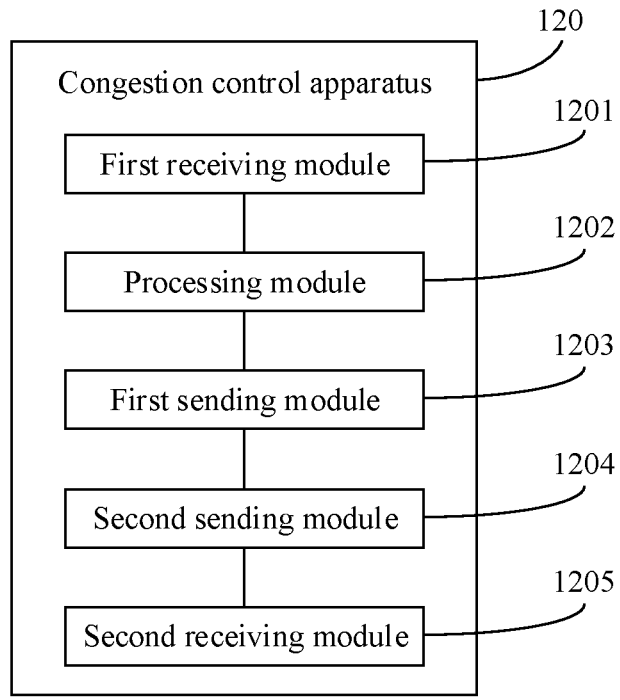
FIG. 13 is a schematic structural diagram of still another congestion control apparatus according to an embodiment.

Optionally, as shown in FIG. 13, the apparatus 120 further includes a second sending module 1204.

The second sending module 1204 may be configured to send an ECN message to a cloud device, where the ECN message includes the first ECN inference model and an identifier of a service type corresponding to the first ECN inference model.

Optionally, the ECN message further includes networking information of a network managed by the network device.

Optionally, still referring to FIG. 13, the apparatus 120 further includes a second receiving module 1205.

The second sending module 1204 is configured to send an ECN inference model obtaining request to the cloud device, where the ECN inference model obtaining request includes a target service type carried in a network managed by the analysis device. The second receiving module 1205 is configured to receive a second ECN inference model that is corresponding to the target service type and that is sent by the cloud device. The first sending module 1203 is further configured to send the second ECN inference model to the network device managed by the analysis device.

In conclusion, in the congestion control apparatus provided in this embodiment, the analysis device receives, through the first receiving module, the ECN parameter sample sent by the network device; performs training by using the ECN parameter sample through the processing module, to obtain an ECN inference model; and then sends an updated ECN inference model to the network device through the first sending module. Then, the network device may determine a new ECN configuration parameter by using the updated ECN inference model. In other words, the analysis device may dynamically configure an ECN inference model in the network device. This implements dynamic adjustment of the ECN configuration parameter in the network device and improves flexibility of network congestion control. In addition, the network device may send the target indication information to the analysis device, to notify the analysis device that the ECN inference model in the network device does not adapt to the network device, so that the analysis device can effectively update the ECN inference model in the network device in a timely manner, thereby improving update flexibility of the ECN inference model in the network device. The analysis device may send a target ECN inference model only to a network device that has sent the target indication information, to save transmission resources and save processing resources of a network device including an ECN inference model that outputs an ECN configuration parameter whose confidence is greater than or equal to a confidence threshold.

Figure 14:
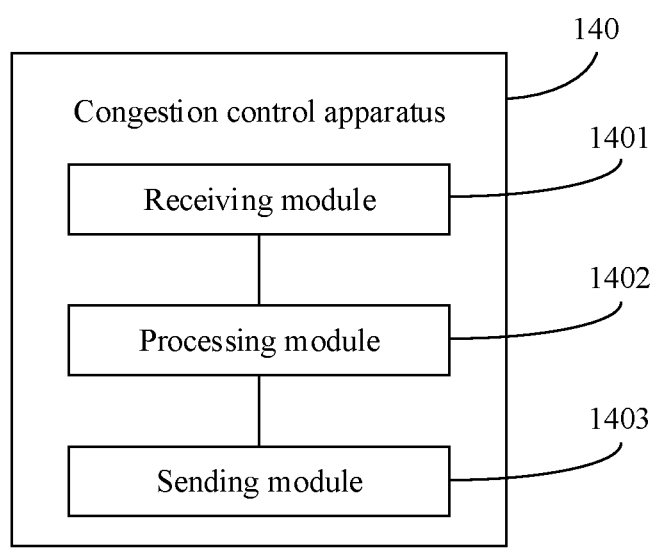
FIG. 14 is a schematic structural diagram of yet another congestion control apparatus according to an embodiment.

FIG. 14 is a schematic structural diagram of yet another congestion control apparatus according to an embodiment. The apparatus may be used in a cloud device in the congestion control system shown in FIG. 2. As shown in FIG. 14, the apparatus 140 includes: a receiving module 1401 configured to receive an ECN inference model obtaining request sent by an analysis device managed by the cloud device, where the ECN inference model obtaining request includes a target service type carried in a network managed by the analysis device; a processing module 1402 configured to determine, based on correspondences between service types and ECN inference models, a second ECN inference model corresponding to the target service type, where the correspondences include a plurality of service types and a plurality of ECN inference models that are in a one-to-one correspondence; and a sending module 1403 configured to send the second ECN inference model to the analysis device.

In conclusion, in the congestion control apparatus provided in this embodiment, the cloud device may receive, through the receiving module, ECN information sent by the analysis device managed by the cloud device, and determine, through the processing module, ECN inference models corresponding to one or more service types. The analysis device may obtain, from the cloud device, an ECN inference model corresponding to a service type carried in the network managed by the analysis device, and then send the ECN inference model to a network device managed by the analysis device. This implements dynamic configuration of an ECN inference model in the network device, implements dynamic adjustment of an ECN configuration parameter, and improves flexibility of network congestion control. In addition, an ECN inference model corresponding to each service type is stored in the cloud device. This provides a sound initial ECN inference model for new network deployment or a networking change in the future.

Optionally, the receiving module 1401 is further configured to receive ECN messages sent by a plurality of analysis devices managed by the cloud device. The ECN messages each include a first ECN inference model in the analysis device and an identifier of a service type corresponding to the first ECN inference model. The processing module 1402 is further configured to generate the correspondences based on the ECN messages sent by the plurality of analysis devices.

Optionally, the processing module 1402 is further configured to: classify first ECN inference models in the plurality of ECN messages based on service types, to obtain one or more model classes, where first ECN inference models in a same model class correspond to a same service type; and for each model class including a plurality of first ECN inference models, perform model iteration processing on the plurality of first ECN inference models in the model class, to obtain one second ECN inference model corresponding to the model class.

In conclusion, in the congestion control apparatus provided in this embodiment, the cloud device may receive, through the receiving module, the ECN information sent by the analysis device managed by the cloud device, and determine, through the processing module, the ECN inference models corresponding to the one or more service types. The analysis device may obtain, from the cloud device, the ECN inference model corresponding to the service type carried in the network managed by the analysis device, and then send the ECN inference model to the network device managed by the analysis device. This implements dynamic configuration of the ECN inference model in the network device, implements dynamic adjustment of the ECN configuration parameter, and improves flexibility of network congestion control. In addition, an ECN inference model corresponding to each service type is stored in the cloud device. This provides a sound initial ECN inference model for new network deployment or a networking change in the future.

For the apparatus in the foregoing embodiment, a specific manner of performing an operation by each module is described in detail in the embodiments related to the method, and details are not described herein again.

An embodiment provides a network device, including a processor and a memory.

The memory is configured to store a computer program, and the computer program includes a program instruction.

The processor is configured to invoke the computer program to implement the steps performed by the network device in the congestion control method shown in FIG. 7 or FIG. 9.

An embodiment provides an analysis device, including a processor and a memory.

The memory is configured to store a computer program, and the computer program includes a program instruction.

The processor is configured to invoke the computer program to implement the steps performed by the analysis device in the congestion control method shown in FIG. 7 or FIG. 9.

An embodiment provides a cloud device, including a processor and a memory.

The memory is configured to store a computer program, and the computer program includes a program instruction.

The processor is configured to invoke the computer program to implement the steps performed by the cloud device in the congestion control method shown in FIG. 9.

Figure 15:
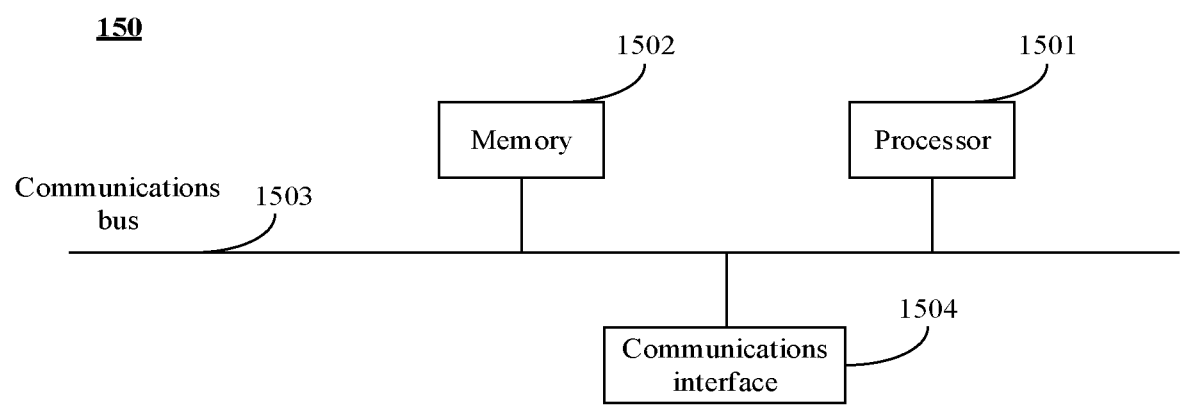
FIG. 15 is a block diagram of a congestion control apparatus according to an embodiment.

For example, FIG. 15 is a block diagram of a congestion control apparatus according to an embodiment. The congestion control apparatus may be a network device, an analysis device, or a cloud device. As shown in FIG. 15, the congestion control apparatus 150 includes a processor 1501 and a memory 1502.

The memory 1502 is configured to store a computer program, and the computer program includes a program instruction.

The processor 1501 is configured to invoke the computer program, to implement the steps performed by the network device in the congestion control method shown in FIG. 7 or FIG. 9, or to implement the steps performed by the analysis device in the congestion control method shown in FIG. 7 or FIG. 9, or to implement the steps performed by the cloud device in the congestion control method shown in FIG. 9.

Optionally, the congestion control apparatus 150 further includes a communications bus 1503 and a communications interface 1504.

The processor 1501 includes one or more processing cores, and the processor 1501 executes various function applications and data processing by running the computer program.

The memory 1502 may be configured to store the computer program. Optionally, the memory may store an operating system and an application program unit used by at least one function. The operating system may be an operating system such as a Real Time executive (RTX), LINUX, UNIX, WINDOWS, or OS X.

There may be a plurality of communications interfaces 1504, and the communications interface 1504 is configured to communicate with another device. For example, in this embodiment, when the congestion control apparatus 150 is a network device, the communications interface 1504 may be configured to send an ECN parameter sample to an analysis device. When the congestion control apparatus 150 is an analysis device, the communications interface 1504 may be configured to send an ECN inference model to a network device and/or a cloud device. When the congestion control apparatus 150 is a cloud device, the communications interface 1504 may be configured to send an ECN inference model to an analysis device.

The memory 1502 and the communications interface 1504 are separately connected to the processor 1501 through the communications bus 1503.

An embodiment further provides a congestion control system, including a network device and an analysis device. The network device includes the congestion control apparatus shown in FIG. 11 or FIG. 15. The analysis device includes the congestion control apparatus shown in FIG. 12, FIG. 13, or FIG. 15. For example, the congestion control system may be shown in FIG. 1.

Optionally, the system further includes a cloud device, and the cloud device includes the congestion control apparatus shown in FIG. 14 or FIG. 15. For example, the congestion control system may be shown in FIG. 2.

An embodiment further provides a computer storage medium. The computer storage medium stores an instruction. When the instruction is executed by a processor of a computer device, steps performed by the network device, the analysis device, or the cloud device in the congestion control method in the foregoing method embodiment are implemented.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, a compact disc, or the like.

In the embodiments, the terms "first", "second", and "third" are merely used for a purpose of description, and shall not be understood as an indication or implication of relative importance.

The term "and/or" describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

The foregoing descriptions are merely optional embodiments, but are not intended to limit this disclosure. Any modification, equivalent replacement, improvement, or the like made without departing from the idea and principle of this disclosure shall fall within the protection scope of this disclosure.

What is claimed is:

1. A method implemented by a network device and comprising:
 inputting first network status information of the network device in a first time period into an explicit congestion notification (ECN) inference model;
 obtaining, based on the first network status information, an inference result from the ECN inference model, wherein the inference result comprises an original ECN configuration parameter;
 sending, to an analysis device that manages the network device, an ECN parameter sample comprising a target ECN configuration parameter, wherein the target ECN configuration parameter is based on the inference result; and
 receiving, from the analysis device and based on training with the ECN parameter sample, an updated ECN inference model.

2. The method of claim 1, further comprising performing, using the target ECN configuration parameter, congestion control in a second time period, wherein the second time period is later than the first time period in a time sequence.

3. The method of claim 1, wherein the inference result further comprises a confidence of the original ECN configuration parameter, and wherein after obtaining the inference result and when the confidence is less than a confidence threshold, the method further comprises:
 adjusting, based on a change of transmission performance of the network device, an ECN configuration parameter to obtain an adjusted ECN configuration parameter; and
 using the adjusted ECN configuration parameter as the target ECN configuration parameter.

4. The method of claim 3, wherein adjusting the ECN configuration parameter comprises:
 when the transmission performance improves from a third time period to the first time period, increasing an ECN threshold in the ECN configuration parameter or lowering an ECN marking probability in the ECN configuration parameter, wherein the third time period is earlier than the first time period in a time sequence; and
 when the transmission performance deteriorates from the third time period to the first time period, lowering the ECN threshold or increasing the ECN marking probability.

5. The method of claim 4, wherein when a bandwidth utilization of the network device increases, a queue depth of the network device decreases, or an ECN packet ratio of the network device decreases from the third time period to the first time period, the method further comprises detecting that the transmission performance of the network device has improved from the third time period to the first time period.

6. The method of claim 1, wherein the inference result further comprises a confidence of the original ECN configuration parameter, and wherein after obtaining the inference result and when the confidence is greater than or equal to a confidence threshold, the method further comprises using the original ECN configuration parameter as the target ECN configuration parameter.

7. The method of claim 1, wherein the inference result further comprises a confidence of the original ECN configuration parameter, wherein after obtaining the inference result and when the confidence is less than a confidence threshold, the method further comprises sending target indication information to the analysis device, and wherein the target indication information comprises an identifier of the network device and indicates that the ECN inference model does not adapt to the network device.

8. The method of claim 7, wherein the target indication information comprises the confidence.

9. The method of claim 1, wherein after receiving the updated ECN inference model, the method further comprises updating, using the updated ECN inference model, the ECN inference model.

10. The method of claim 1, wherein the first network status information comprises queue information, throughput information, or congestion information of the network device in the first time period.

11. A network device comprising:
one or more processors; and
one or more memories coupled to the one or more processors and configured to store programming instructions, wherein the one or more processors are configured to execute the programming instructions to cause the network device to:
input first network status information of the network device in a first time period into an explicit congestion notification (ECN) inference model;
obtain, based on the first network status information, an inference result from the ECN inference model, wherein the inference result comprises an original ECN configuration parameter;
send, to an analysis device that manages the network device, an ECN parameter sample comprising a target ECN configuration parameter, wherein the target ECN configuration parameter is based on the inference result; and
receive, from the analysis device and based on training with the ECN parameter sample, an updated ECN inference model.

12. The network device of claim 11, wherein the programming instructions, when executed by the one or more processors, further cause the network device to perform, using the target ECN configuration parameter, congestion control in a second time period, and wherein the second time period is later than the first time period in a time sequence.

13. The network device of claim 11, wherein the inference result further comprises a confidence of the original ECN configuration parameter, and wherein the programming instructions, when executed by the one or more processors, further cause the network device to:
adjust, based on a change of transmission performance of the network device, an ECN configuration parameter to obtain an adjusted ECN configuration parameter; and
use the adjusted ECN configuration parameter as the target ECN configuration parameter.

14. The network device of claim 13, wherein the programming instructions, when executed by the one or more processors, further cause the network device to:
when the transmission performance improves from a third time period to the first time period, increase an ECN threshold in the ECN configuration parameter or lower an ECN marking probability in the ECN configuration parameter, wherein the third time period is earlier than the first time period in a time sequence; and
when the transmission performance deteriorates from the third time period to the first time period, lower the ECN threshold or increase the ECN marking probability.

15. The network device of claim 14, wherein when a bandwidth utilization of the network device increases, a queue depth of the network device decreases, or an ECN packet ratio of the network device decreases from the third time period to the first time period, the programming instructions, when executed by the one or more processors, further cause the network device to detect that the transmission performance of the network device has improved from the third time period to the first time period.

16. The network device of claim 11, wherein the inference result further comprises a confidence of the original ECN configuration parameter, and when the confidence is greater than or equal to a confidence threshold, the programming instructions, when executed by the one or more processors, further cause the network device to use the original ECN configuration parameter as the target ECN configuration parameter.

17. The network device of claim 11, wherein the inference result further comprises a confidence of the original ECN configuration parameter, wherein when the confidence is less than a confidence threshold, the programming instructions, when executed by the one or more processors, further cause the network device to send target indication information to the analysis device, and wherein the target indication information comprises an identifier of the network device and indicates that the ECN inference model does not adapt to the network device.

18. The network device of claim 17, wherein the target indication information comprises the confidence.

19. The network device of claim 11, wherein the programming instructions, when executed by the one or more processors, further cause the network device to update, using the updated ECN inference model, the ECN inference model.

20. A computer program product comprising instructions stored on a non-transitory computer-readable medium that, when executed by one or more processors, cause a network device to:
input first network status information of the network device in a first time period into an explicit congestion notification (ECN) inference model;
obtain, based on the first network status information, an inference result from the ECN inference model, wherein the inference result comprises an original ECN configuration parameter;
send, to an analysis device that manages the network device, an ECN parameter sample comprising a target ECN configuration parameter, wherein the target ECN configuration parameter is based on the inference result; and
receive, from the analysis device and based on training with the ECN parameter sample, an updated ECN inference model.

* * * * *